(12) United States Patent
Minagawa

(10) Patent No.: US 9,135,528 B2
(45) Date of Patent: Sep. 15, 2015

(54) INFORMATION PROCESSING APPARATUS, JOB PROCESSING METHOD IN INFORMATION PROCESSING APPARATUS, AND STORAGE MEDIUM

(75) Inventor: Tomonori Minagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 13/283,385

(22) Filed: Oct. 27, 2011

(65) Prior Publication Data

US 2012/0120439 A1 May 17, 2012

(30) Foreign Application Priority Data

Nov. 11, 2010 (JP) ................................ 2010-253197

(51) Int. Cl.
*G06F 3/12* (2006.01)
*G06K 15/00* (2006.01)

(52) U.S. Cl.
CPC ............ *G06K 15/005* (2013.01); *G06F 3/1208* (2013.01); *G06F 3/1255* (2013.01); *G06F 3/1288* (2013.01); *G06K 15/405* (2013.01); *G06F 3/1271* (2013.01)

(58) Field of Classification Search
CPC .... G06F 3/1208; G06F 3/1255; G06K 15/405
USPC ....................................................... 358/1.15
See application file for complete search history.

(56) References Cited

U.S. PATENT DOCUMENTS

| 2003/0053106 A1* | 3/2003 | Kuroda et al. ............... 358/1.13 |
| 2007/0146759 A1* | 6/2007 | Saito ............................ 358/1.13 |
| 2011/0176161 A1* | 7/2011 | Matsumoto ................... 358/1.14 |

FOREIGN PATENT DOCUMENTS

| JP | 2002-326433 A | 11/2002 |
| JP | 2007-179197 A | 7/2007 |
| JP | 2008-097226 A | 4/2008 |
| JP | 2008-165395 A | 7/2008 |
| JP | 2009-009387 A | 1/2009 |
| JP | 2010-191631 A | 9/2010 |

* cited by examiner

*Primary Examiner* — Marivelisse Santiago Cordero
*Assistant Examiner* — Kevin Ky
(74) *Attorney, Agent, or Firm* — Canon USA, Inc., IP Division

(57) ABSTRACT

A user inputs information, such as a user identification (ID), on a printer by using an operation unit included in the printer. The printer inputs a print request for printing an intermediate print job corresponding to the user ID to the printer driver of an application server. When the request is received from the printer, a print request receiving function of the printer driver starts a series of print processing. The printer driver extracts an intermediate print job corresponding to a target user ID stored on a print job storage memory. A print setting final determination function finally determines print setting information to the extracted intermediate print job.

3 Claims, 18 Drawing Sheets

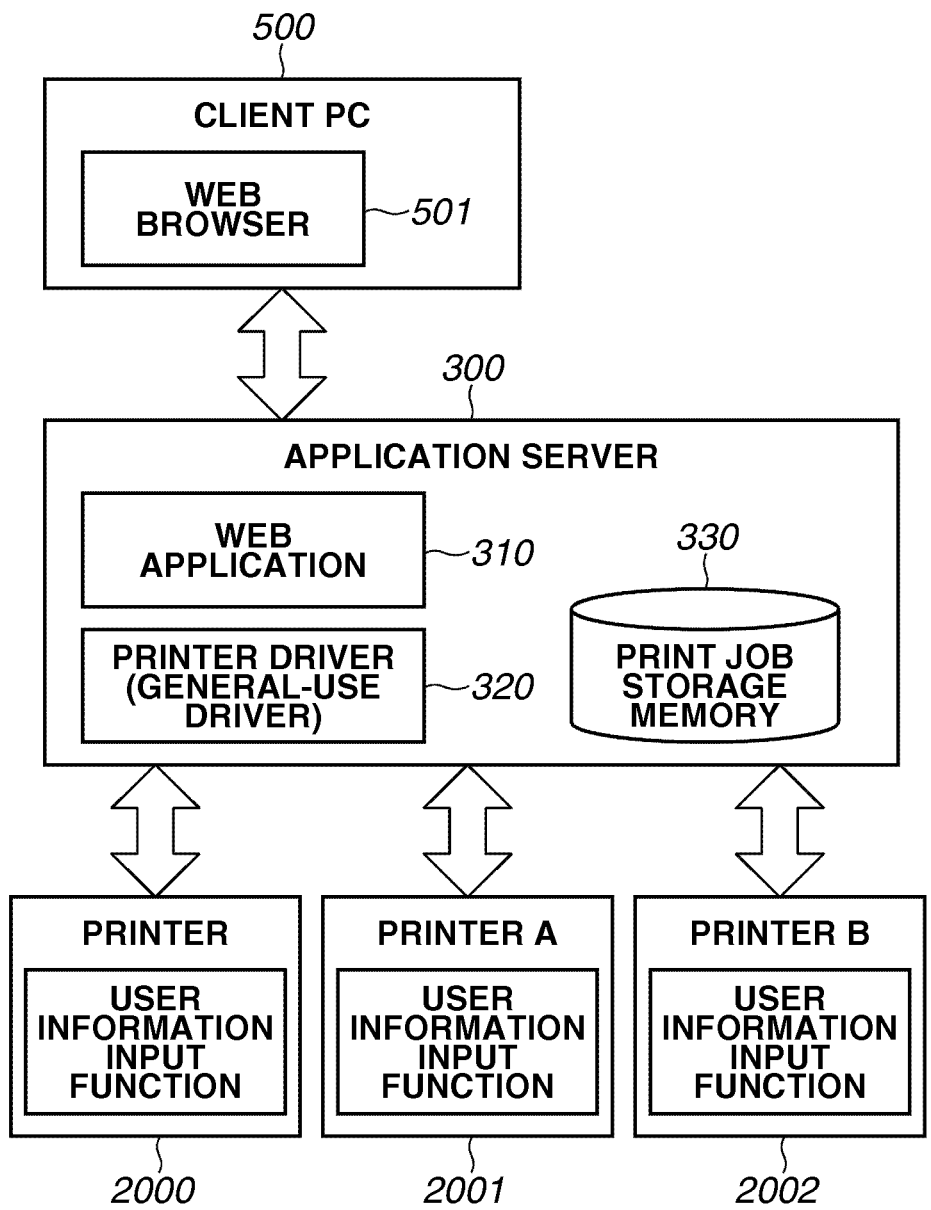

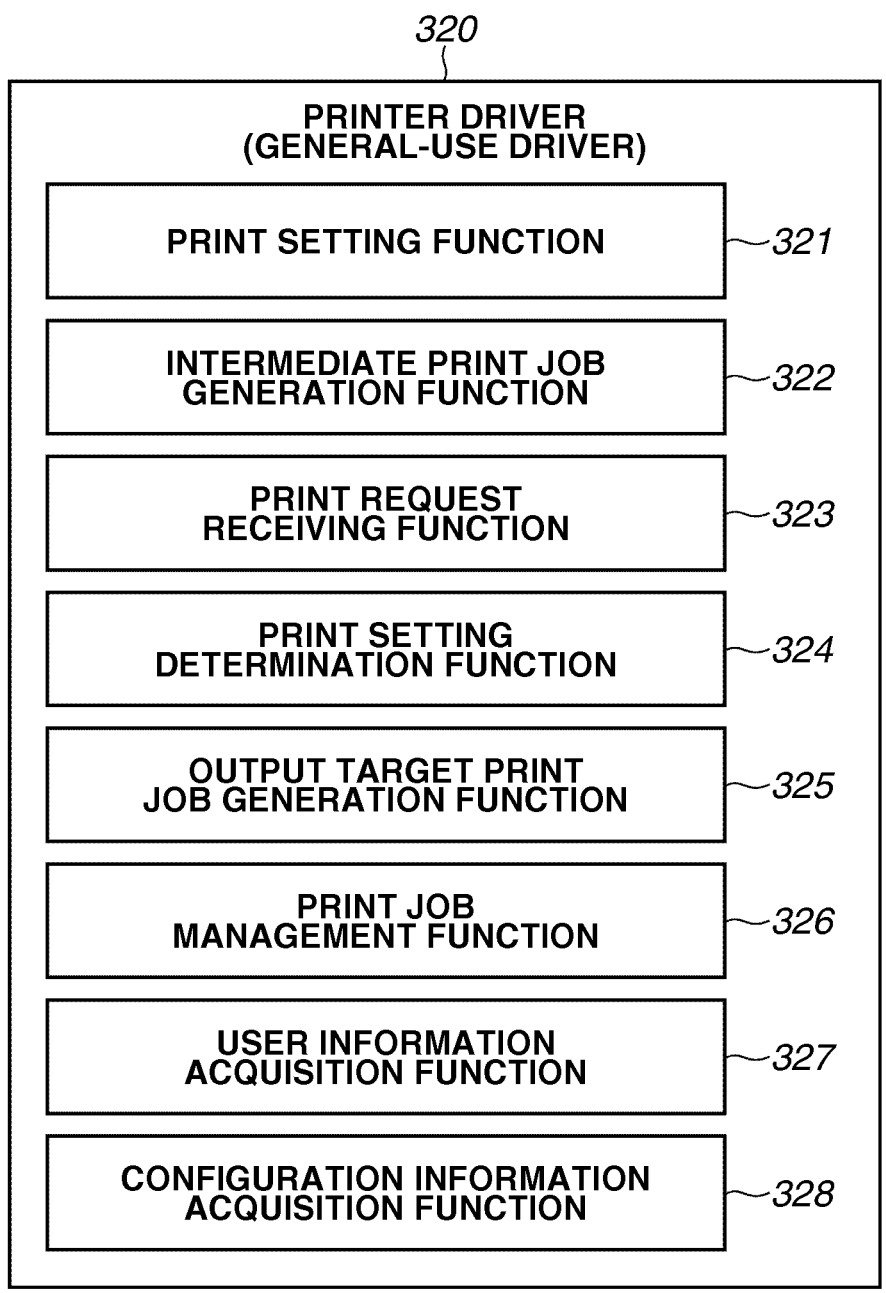

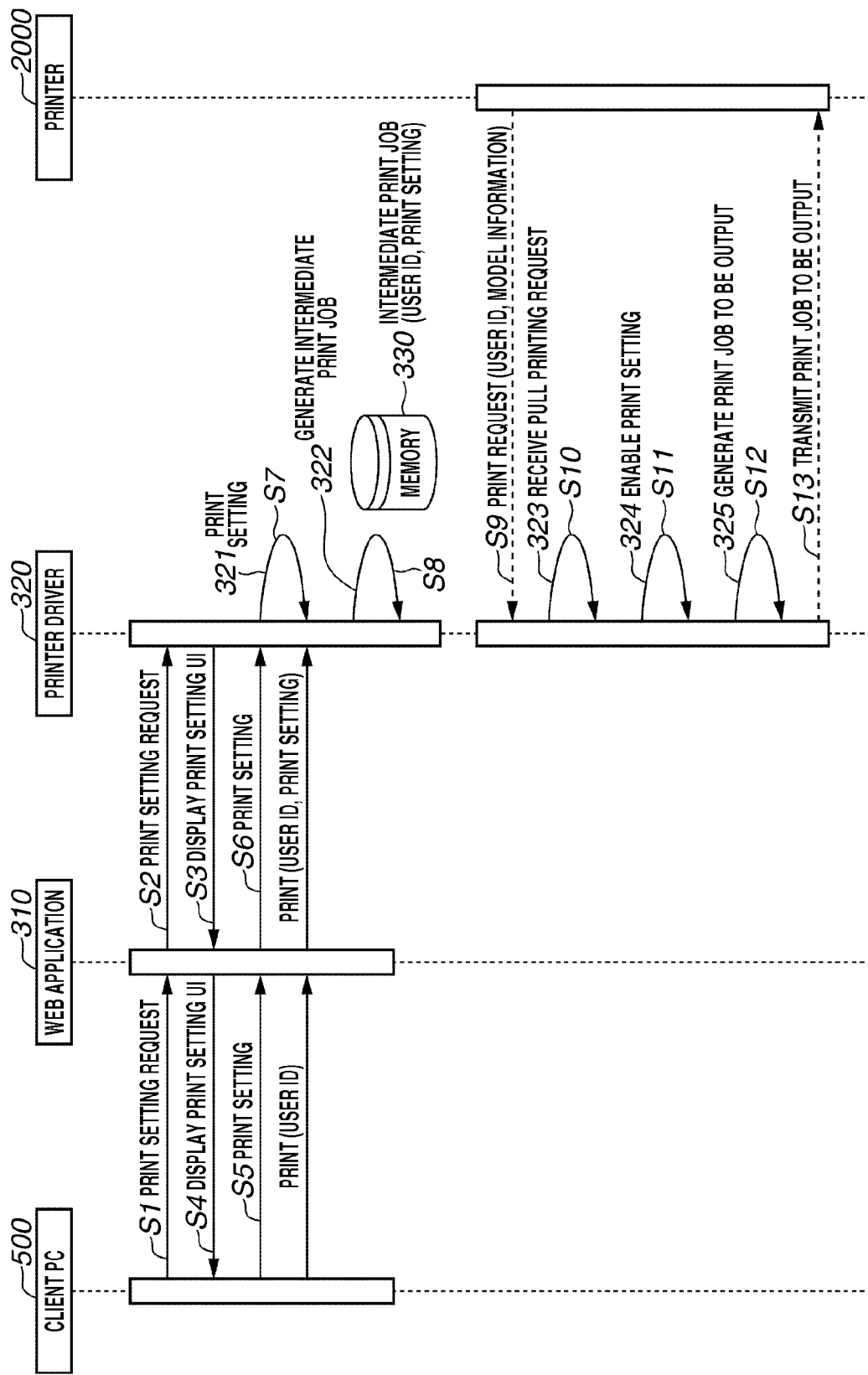

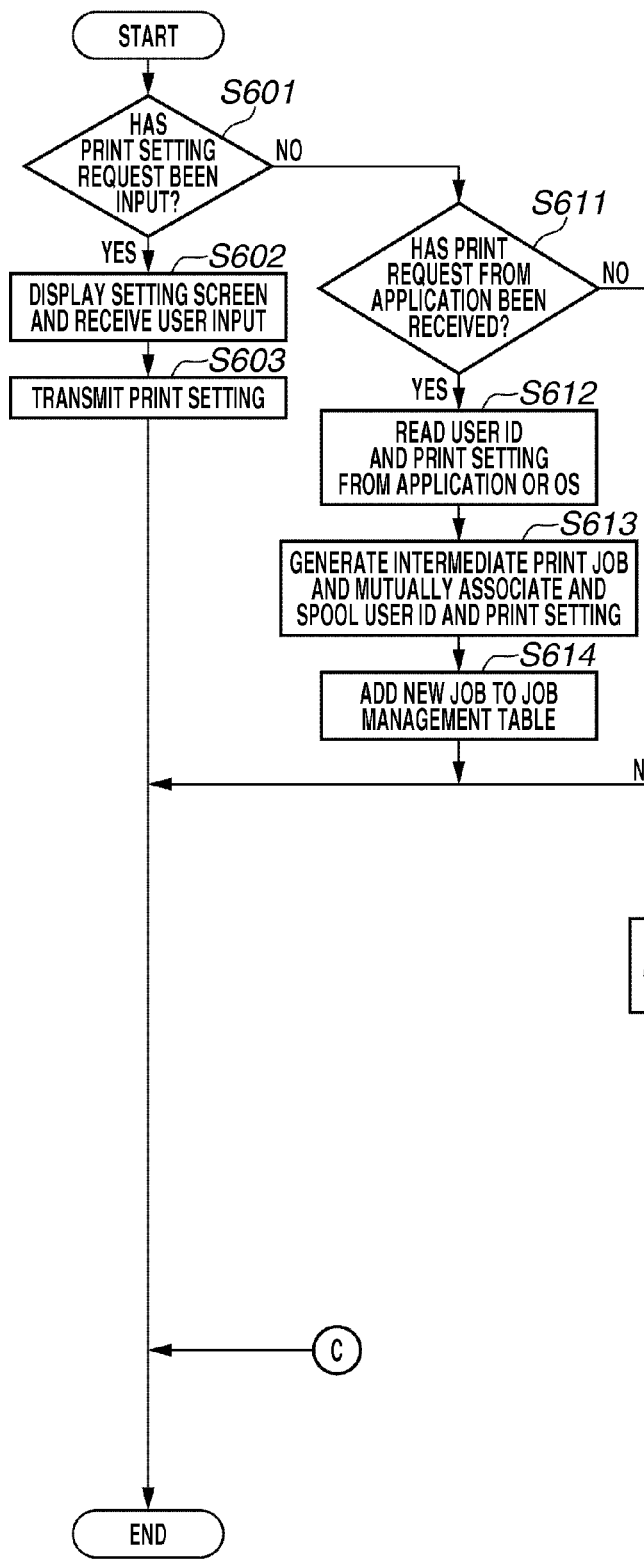

FIG.7

| PROPERTY - XXXXX | | | | ✕ |
|---|---|---|---|---|
| DOCUMENT SIZE | A3 ▽ | NUMBER OF COPIES | 1 | |
| OUTPUT PAPER SIZE | SAME AS DOCUMENT SIZE △<br>A3<br>A4<br>B4 ▽ | PAGE LAYOUT<br>MAGNIFICATION | 2 PAGES/SHEET ▽<br>100 % | |
| OUTPUT METHOD | BINDING<br>TWO-SIDED<br>ONE-SIDED | | | |
| PAPER DISCHARGE METHOD | STAPLING | ON<br>OFF | | |
| | PUNCHING | ON<br>OFF | COLOR MODE | COLOR<br>MONOCHROMATIC |

( OK ) ( CANCEL ) ( HELP )

FIG.8

| JOB NAME | USER ID | PRINT SETTING |
|----------|---------|---------------|
| Job1 | UserA | Setting1 |
| Job2 | UserA | Setting2 |
| Job3 | UserB | Setting3 |

FIG.9

| | LOW | ◄------------► | | HIGH |
|---|---|---|---|---|
| PAPER SIZE | A4 | . . . | | SAME AS DOCUMENT SIZE |
| COLOR | MONOCHROMATIC | . . . | | COLOR |
| FINISHING | ONE-SIDED | . . . TWO-SIDED . . . | | BINDING |
| STAPLING | OFF | . . . | | ON |
| | OFF | . . . AT ONE POSITION . . . | | AT TWO POSITIONS |

FIG.14

| JOB NAME | USER ID | PRINT SETTING | STATUS |
|---|---|---|---|
| Job1 | UserA | Setting1 | INCOMPLETE |
| Job2 | UserA | Setting2 | UNPROCESSED |
| Job3 | UserB | Setting3 | UNPROCESSED |

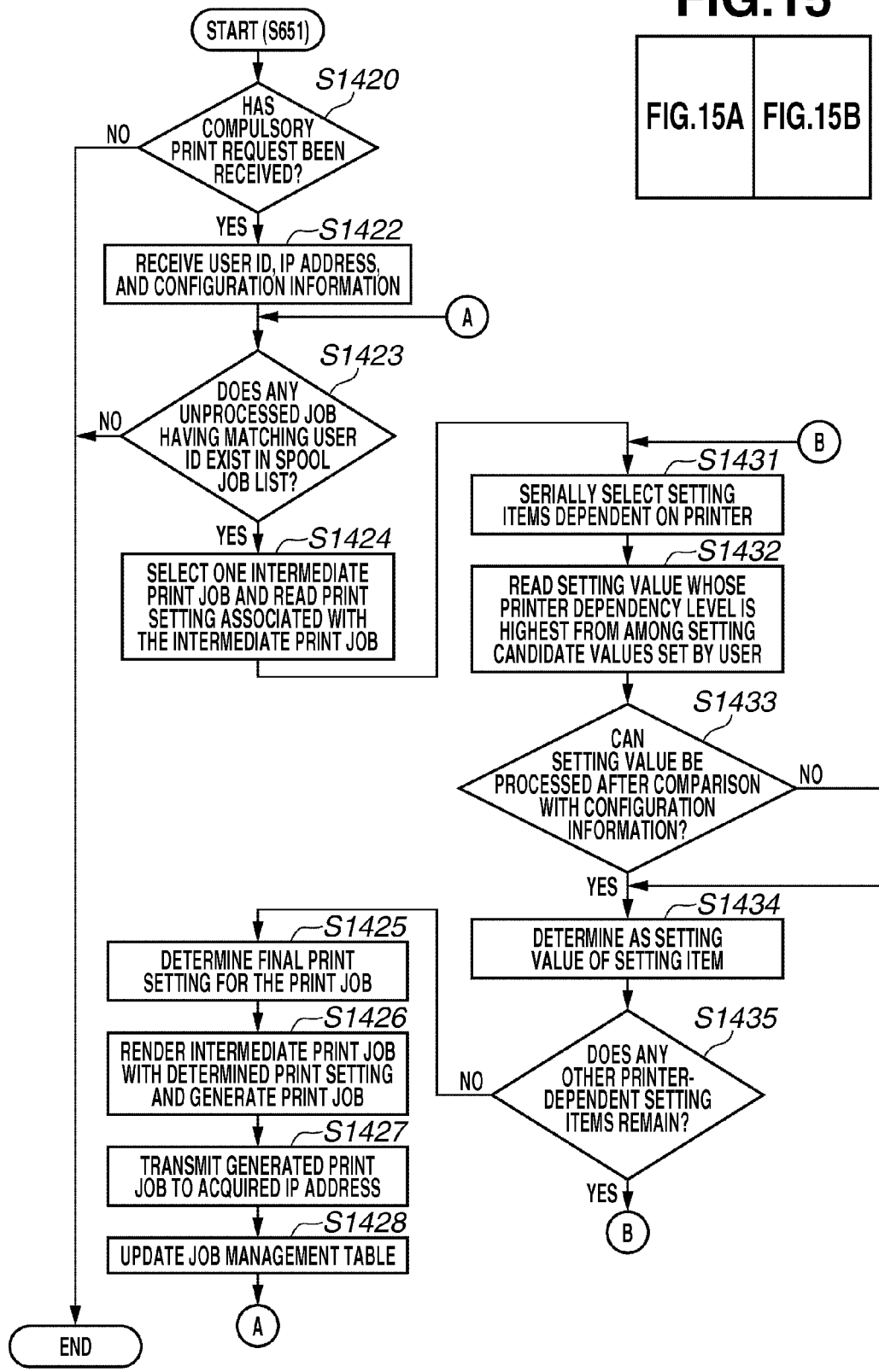

INFORMATION PROCESSING APPARATUS, JOB PROCESSING METHOD IN INFORMATION PROCESSING APPARATUS, AND STORAGE MEDIUM

BACKGROUND OF THE INVENTION

1. Field of the Invention

The present invention relates to an information processing apparatus and a job processing method in the information processing apparatus capable of receiving a print request from any of a plurality of printing apparatuses having mutually different print processing functions via a network, and a program therefor.

2. Description of the Related Art

In a pull printing system, a server temporarily stores a print job generated by a client apparatus (client personal computer (PC)) and the print job is transferred from the server to a printer in response to a print request from the printer. By centrally managing and controlling a printer and a printer driver for the printer on the server, it is feasible to implement a client that does not require a printer driver and to easily utilize a plurality of printers from a client.

However, in the pull printing system, which printer is to be used to output an input print job is not determined yet at the timing of generating the print job on a client PC. Accordingly, in this case, a print product desired by a user may not be output. More specifically, even if a print job including a stapling setting has been generated by a client PC, if a printer that has input a print request does not include a staple function, then a print product to which stapling is not executed may be output.

In order to solve the above-described problem, Japanese Patent Application Laid-Open No. 2008-097226 discusses a method in which if a designated printer does not support a function designated in print setting information, printing is suspended or cancelled. In addition, Japanese Patent Application Laid-Open No. 2008-097226 discusses a method in which if a previously permitted setting value included in print setting information does not match the capability or the performance of the designated printer, printing is compulsorily executed.

However, the method discussed in Japanese Patent Application Laid-Open No. 2008-097226 may not output a print product in relation to parameters that have been ignored in compulsorily executing the printing. More specifically, if the paper size has been ignored, i.e., if a print job for printing an A3-size image on an A3 sheet has been input but the paper size is changed from the A3 size to the A4 size, then the image to be printed may be only partially printed on the A4 sheet.

SUMMARY OF THE INVENTION

The present invention is directed to a method capable of suppressing a threat of outputting a print product not desired by a user regardless of from which printing apparatus the user has input a request for pull printing.

According to an aspect of the present invention, an information processing apparatus, which is configured to receive a print request from any of a plurality of printing apparatuses having mutually different print processing functions via a network, includes a provision unit configured to provide a client apparatus with an application service and a print processing service for printing print information, which is generated by using the application service, an acquisition unit configured to acquire, from the client apparatus, (a) print setting information, which is set by the client apparatus to the print information by using a user interface provided by the print processing service, to at least one setting item of which a plurality of setting values is set, (b) the print information, and (c) identification information for identifying a user who has generated the print information, a generation unit configured to generate an intermediate print job that does not depend on model information about the plurality of printing apparatuses based on the print information acquired by the acquisition unit from the client apparatus, and a registration unit configured to mutually associate the intermediate print job generated by the generation unit, the identification information, and the print information and to register the mutually associated intermediate print job, the identification information, and the print information on a storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 3 is a block diagram illustrating an exemplary software configuration of the printing system.

FIG. 4 is a block diagram illustrating exemplary functional processing software modules of a printer driver.

FIG. 5 is a flow chart illustrating a series of print processing executed by the printing system.

FIG. 7 illustrates an exemplary user interface provided to a client apparatus.

FIG. 8 illustrates an example of a job management table generated on a random access memory (RAM).

FIG. 9 illustrates an example of dependency between model information about a printing apparatus and print setting information.

FIG. 14 illustrates an example of a job management table generated on a RAM.

DESCRIPTION OF THE EMBODIMENTS

Various exemplary embodiments, features, and aspects of the invention will be described in detail below with reference to the drawings.

Figure 1:
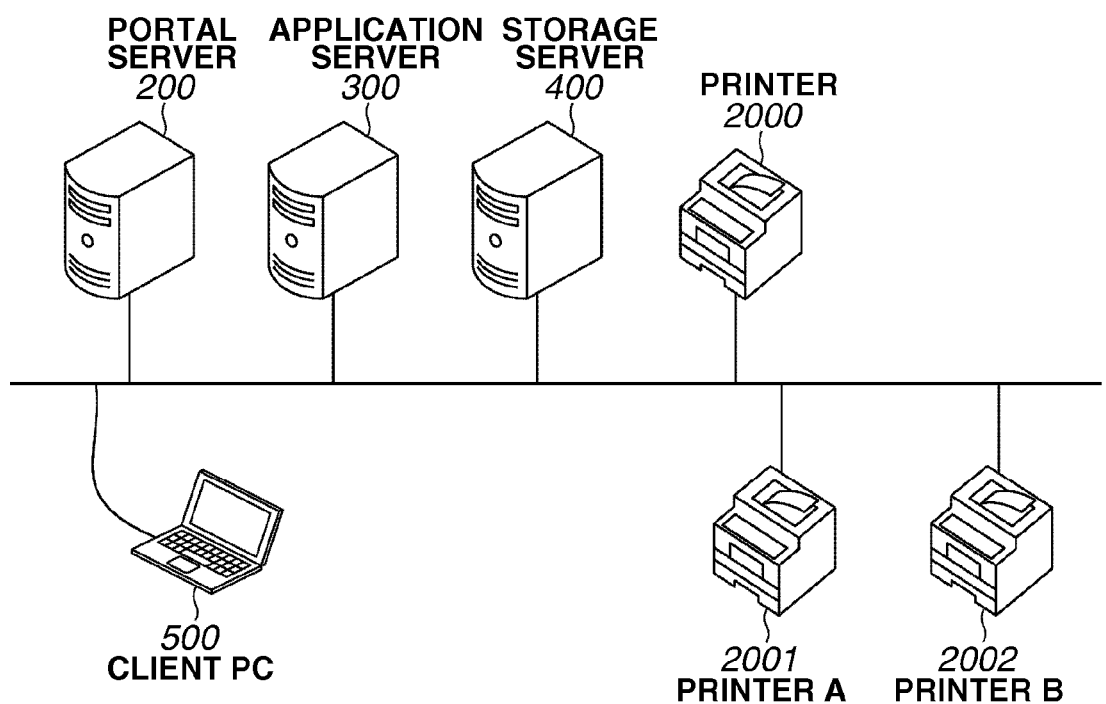
FIG. 1 illustrates an example of a printing system including an information processing apparatus according to an exemplary embodiment of a present invention.

A pull printing system that uses a computer, which is an example of an information processing apparatus according to an exemplary embodiment of the present invention, will be described in detail below. Referring to FIG. 1, the pull printing system includes a plurality of printers having different model information.

In the present exemplary embodiment, the model information includes various information, such as an output paper size, an output method, a paper discharge method, a number of copies, a page layout, a magnification, and a color mode. In addition, in the present exemplary embodiment, the pull printing system includes a plurality of printing apparatuses. However, the printing apparatus included in the pull printing system according to the present exemplary embodiment can include an image forming apparatus having a print function, such as a multifunction peripheral (MFP).

FIG. 1 illustrates an example of a printing system including an information processing apparatus according to a first exemplary embodiment of the present invention. In the exemplary system illustrated in FIG. 1, input and output devices, particularly a keyboard (input unit) and a display (display device (output unit)) are omitted.

More specifically, in the exemplary system illustrated in FIG. 1, the information processing apparatus is configured to receive a print request from any of a plurality of printing apparatuses having different print processing functions. In addition, the information processing apparatus is configured to provide a client apparatus (hereinafter simply referred to as a "client PC"), which will be described in detail below, with a web application service and a print processing service for printing print information generated on a client apparatus by using the web application service.

In providing the service, the information processing apparatus provides the client apparatus with a user interface to the client apparatus and executes processing for receiving print setting information for generated print information. An example of the user interface provided to the client apparatus is illustrated in FIG. 7. Via the user interface illustrated in FIG. 7, the information processing apparatus is capable of receiving print setting information, which is set to print information and to at least one of whose setting items a plurality of setting values can be set. As will be described in detail below, the setting value includes a setting value having a high dependency on a function of a printing apparatus and a setting value having a low dependency on a function of a printing apparatus.

The system according to the present exemplary embodiment at least includes a client PC 500, a printer 2000, and an application server 300. The application server 300 manages an application for generating a document. Furthermore, a printer driver (a general-purpose driver) 320, which is configured to generate a print job to be output, is installed to the application server 300. In the present exemplary embodiment, a print job to be output includes data and language bundles processed on a printer that has received a print request from the user.

In addition, a storage server 400, which is configured to store all pieces of digital data, is connected to the system according to the present exemplary embodiment. However, it is not required that various types of data are stored in a dedicated storage server. More specifically, various types of data can be stored within the application server 300.

In addition, the system according to the present exemplary embodiment includes a portal server 200. The portal server 200 provides a portal site useful in executing each management by using a web service. Furthermore, in the system illustrated in FIG. 1, a printer A 2001 and a printer B 2002 are connected to the system. However, the number of the printers is not limited to a particular number. More specifically, in the present exemplary embodiment, it is supposed that at least one printer is connected to the system.

In the present invention, the system illustrated in FIG. 1 particularly includes the client PC 500, the printer 2000, and the application server 300.

Figure 2:
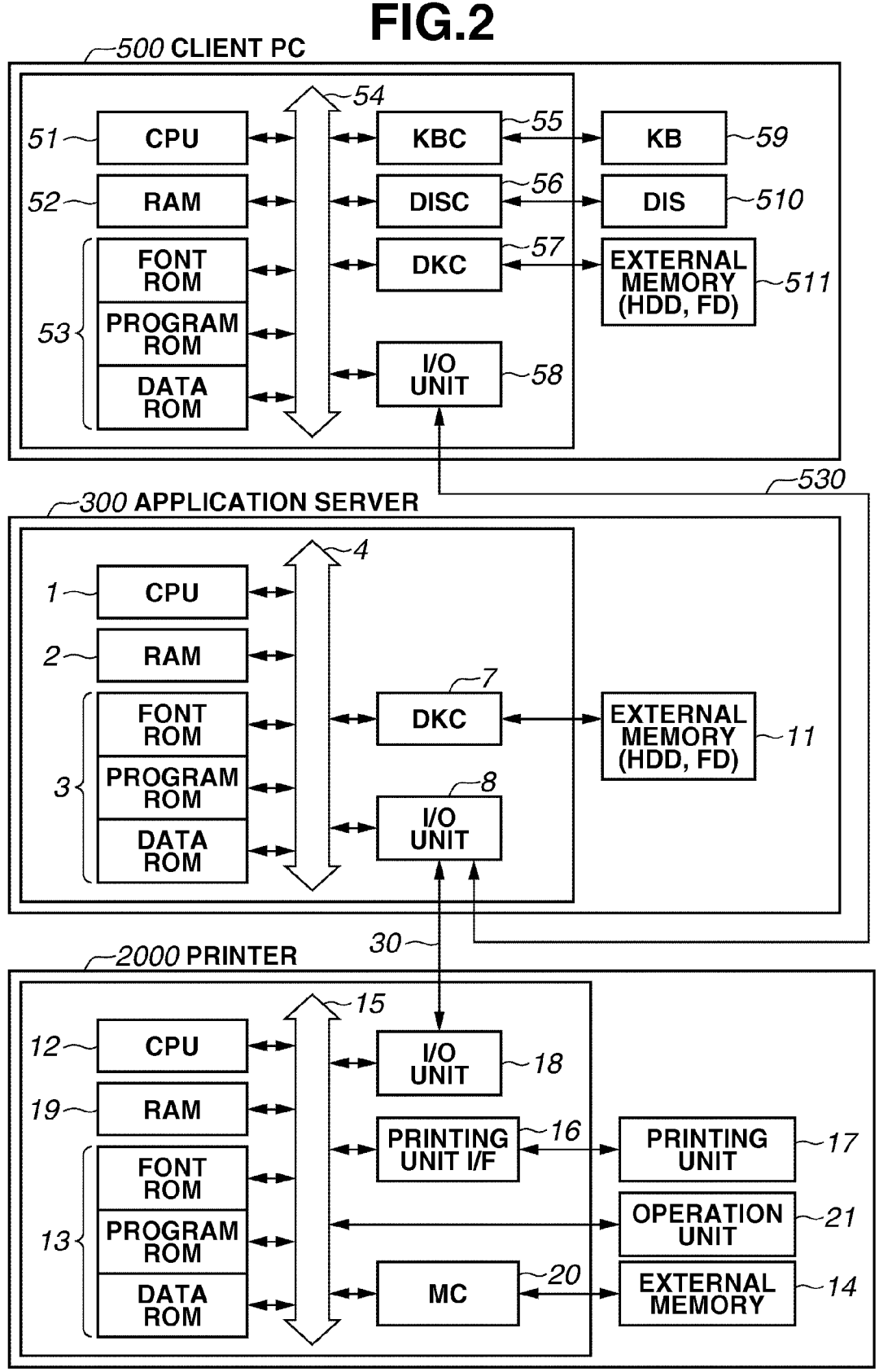
FIG. 2 is a block diagram illustrating an exemplary hardware configuration of the printing system illustrated in FIG. 1.

FIG. 2 is a block diagram illustrating an exemplary hardware configuration of the printing system illustrated in FIG. 1. The system illustrated in FIG. 2 is a printing system illustrated in FIG. 1, which includes the application server 300, the client PC 500, and the printer 2000.

In the example illustrated in FIG. 2, the client PC 500 includes a central processing unit (CPU) 51. The CPU 51 controls an operation of the client PC 500 according to a control program stored on a program read-only memory (ROM) of a ROM 53 or on an external memory 511. The CPU 51 centrally controls devices connected to a system bus 54. An operating system (OS), which is the control program for the CPU 51, and various data, such as font data used in document processing, are stored on the ROM 53 or the external memory 511.

A RAM 52 functions as a main memory and a work area of the CPU 51. A keyboard controller (KBC) 55 controls a key input from a keyboard 59 and a pointing device (not illustrated). A display (DIS) controller (DISC) 56 controls a display by a DIS 510.

A disk controller (DKC) 57 controls an access to the external memory 511, which is configured to store a boot program, various applications, and font data. A hard disk drive (HDD) or a floppy disk (FD) can be used as the external memory 511.

An input/output unit 58 is connected to the application server 300 via an interactive interface (I/F) 530. Furthermore, the input/output unit 58 executes processing for controlling a communication with the application server 300.

The application server 300 includes a CPU 1, which is configured to control an operation of the application server 300 according to a computer program stored on a program ROM of a ROM 3 or an external memory 11. The CPU 1 centrally controls devices connected to a system bus 4. An OS, which is the control program for the CPU 1, and various data, such as font data used in document processing, are stored on the ROM 3 or the external memory 11.

In addition, the printer driver 320, which executes control for performing an operation described below in a flow chart of FIG. 6. Furthermore, a table that defines the level of dependency on an output apparatus and a job management table, which manages an intermediate print job, are stored on the ROM 3 or the external memory 11. The tables will be described in detail later below.

A RAM 2 functions as a main memory and a work area of the CPU 1. A disk controller (DKC) 57 controls an access to the external memory 11, which is configured to store a boot program, various applications, and font data. An HDD or an FD can be used as the external memory 11.

An input/output unit 8 is connected to the client PC 500 and the printer 2000 via an interactive I/F 30. Furthermore, the input/output unit 8 executes processing for controlling a communication with the client PC 500 and the printer 2000.

The printer 2000 is controlled by a CPU 12. The CPU 12 operates according to a control program stored on a ROM 13, or an external memory 14. The CPU 12 outputs an image signal, which is output information, to a printing unit (printer engine) 17. The printing unit 17 is connected to a printing unit I/F 16 via a system bus 15.

In addition, a control program executed by the CPU 12 is stored on a program ROM of the ROM 13. Font data used in generating the above-described output information is stored on a font ROM of the ROM 13. A data ROM of the ROM 13 stores information utilized on the application server 300 when the printer does not include the external memory 14, such as a hard disk.

The CPU 12 can communicate with the application server 300 via an input/output unit 18. In addition, the CPU 12 can notify information about the printer to the application server 300. A RAM 19 functions as a main memory and a work area for the CPU 12. Furthermore, the memory capacity of the RAM 19 can be expanded by using an optional RAM (not illustrated), which can be connected to an expansion port (not illustrated). The RAM 19 is used as an output information rasterization area, an environmental data storage area, and a non-volatile RAM (NVRAM).

An access to the external memory 14, which is an HDD or an integrated circuit (IC) card, is controlled by a memory controller (MC) 20. The external memory 14 is connected as an optional component. Furthermore, the external memory 14 stores font data, an emulation program, and form data.

In addition, the input/output unit 18 is an operation panel, on which an operation switch and a light-emitting diode (LED) display device are provided. The number of the above-described external memory 14 is not limited to one. More specifically, a plurality of optional cards and a plurality of external memories 14, which are configured to store an internal font and a program for interpreting a printer control language for a different language system, can be connected. Furthermore, an NVRAM (not illustrated) can be provided to store printer mode setting information, which is input via an operation unit 21, such as an operation panel.

FIG. 3 is a block diagram illustrating an exemplary software configuration of the printing system illustrated in FIG. 1. Referring to FIG. 3, a web browser 501 is installed to the client PC 500. The user can view and edit document data used by a web application 310. The web application 310 is installed to the application server 300, which is connected to the client PC 500 via the input/output unit 58.

The application server 300 includes the web application 310, which enables the viewing and editing of document data via the web browser 501 of the client PC 500. In addition, the printer driver 320, which executes control for performing an operation of the flow chart illustrated in FIG. 6, is installed to the application server 300 on the external memory 11.

The printer driver 320 receives print setting information from the client PC 500 via the web application 310 and generates a print job to be output (PDL). In the present invention, the print setting information includes setting values, which will be described in detail below.

The printer driver 320 includes the following functions illustrated in FIG. 4. FIG. 4 is a block diagram illustrating exemplary functional processing software modules of the printer driver, which is installed to the application server 300 illustrated in FIG. 1.

Referring to FIG. 4, a print setting function 321 displays a setting screen on the web browser 501 of the client PC 500. In addition, the print setting function 321 receives an input of a candidate value included in print setting information, which is input by the user. An intermediate print job generation function 322 generates an intermediate print job.

A print request receiving function 323 receives a print request from the printer 2000. A user information acquisition function 327 acquires information about the user. A configuration information acquisition function 328 acquires configuration information about the printer 2000.

A print setting determination function 324 selects an appropriate candidate value from among candidate values included in the print setting information about the intermediate print job according to acquired configuration information and determines the print setting information.

An output print job generation function 325 generates an output print job according to the print setting information determined by the print setting determination function 324. In addition, the printer driver 320 associates the intermediate print job with user information and the print setting information and stores the mutually associated intermediate print job, the user information, and the print setting information ion a print job storage memory 330 of the application server 300 illustrated in FIG. 3.

The printer driver 320 includes a print job management function 326. The print job management function 326 loads an intermediate print job from the print job storage memory 330 according to a print request from the printer 2000. In the present exemplary embodiment, the printer driver 320 is a general-purpose driver configured to output information to an arbitrary printer. However, the printer driver 320 is not limited to a general-purpose driver. More specifically, a printer driver that can respond to a print request from a printer can be used as the printer driver 320.

The web application 310 and the printer driver 320 are program modules stored on the external memory 11, loaded on the RAM 2 according to an instruction input by an OS or another program that uses the program, and are executed by the CPU 1. An exemplary operation of print processing according to the present exemplary embodiment, which is executed within the printing system having the above-described hardware configuration and software configuration, will be described in detail below.

FIG. 5 is a flow chart illustrating a series of print processing executed by the printing system according to the present exemplary embodiment. In the following description, processing executed by the client PC 500, the web application 310, and the printer driver 320 for outputting a print job from the portal server 200 will be described.

The user of the client PC 500 executes editing via a screen provided by the web application 310 of the application server 300. The application server 300 generates document data according to the editing by the user.

Referring to FIG. 5, in step S1, the user executes a print setting instruction via a display screen displayed on the display 510 of the client PC 500. In step S2, the web application 310 inputs a print setting request to the printer driver 320.

When the request is received, in step S3, the printer driver 320 inputs a request to the web application 310 for displaying a print setting user interface (UI). In step S4, the web application 310 displays a UI screen (print setting screen) on the web browser 501 of the client PC 500. A user input of print setting information is received via the UI screen.

In step S5, the user sets print setting information via the UI screen displayed by the web browser 501 on the display 510. In step S6, after the print instruction is input by the user, the web application 310 inputs a print request to the printer driver 320. More specifically, the web application 310 transmits document data to be printed to the printer driver 320.

When the print request is received, in step S7, the printer driver 320 transfers the document data to the intermediate print job generation function 322 by using the print setting function 321. In step S8, the intermediate print job generation function 322 generates an intermediate print job based on the received document data.

The print job management function 326 associates the intermediate print job with a user identification (ID), which is acquired by using the user information acquisition function 327, and the above-described print setting information. Furthermore, the print job management function 326 temporarily stores the mutually associated intermediate print job, the user ID, and the print setting information on the print job storage memory 330.

For the user ID, a number uniquely assigned to the user or the name of the user can be used. The user ID can be acquired by an arbitrary method. More specifically, the user ID can be read via an ID card reader. Alternatively, previously registered information can be used, which can be loaded when the user has normally logged into the client PC 500.

Subsequently, the user inputs information about the user ID by using the operation unit 21 of the printer 2000. In step S9, the printer 2000 inputs a print request for printing the intermediate print job corresponding to the user ID to the printer driver 320 of the application server 300. When the request is received from the printer 2000, the print request receiving function 323 of the printer driver 320 starts a series of print processing.

In step S10, the printer driver 320 extracts the intermediate print job corresponding to the target user ID that has been stored on the print job storage memory 330. In step S11, the print setting determination function 324 determines the print setting information about the extracted intermediate print job.

In step S12, the output print job generation function 325 generates an output print job based on the intermediate print job and the determined print setting information. In step S13, the printer driver 320 transmits the generated output print job to the request source printer.

Figure 6B:
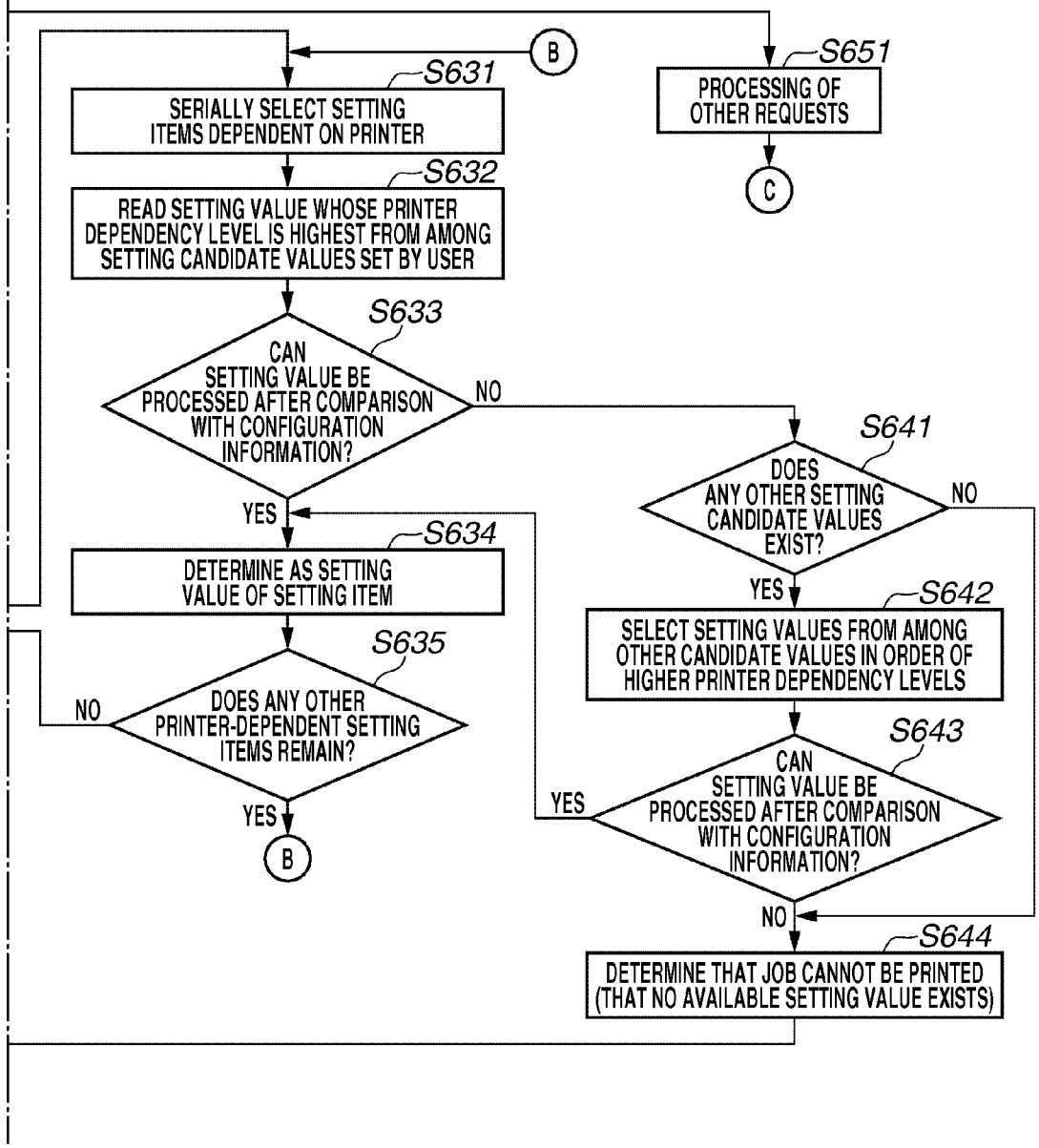
FIG. 6, which is composed of FIGS. 6A and 6B, is a flow chart illustrating an exemplary flow of data processing executed by the information processing apparatus.

A detailed operation executed by the printer driver 320, which is the core of the print processing operation in the flow of the above-described print processing is illustrated in the flow chart of FIG. 6. FIG. 6 is a flow chart illustrating an exemplary flow of data processing executed by the information processing apparatus according to the present exemplary embodiment.

The processing illustrated in the flow chart of FIG. 6 corresponds to processing executed by the printer driver 320 of the application server 300 illustrated in FIG. 2. Each step of the flow chart of FIG. 6 is implemented by the CPU 1 by loading and executing the printer driver 320 on the RAM 2. The processing described below is executed by the printer driver 320.

Referring to FIG. 6, in step S601, the printer driver 320 receives a print setting request from the client PC 500 via the web application 310. In step S602, the print setting function 321 displays a UI (setting screen) illustrated in FIG. 7 on the display 510 by using the web browser 501 via the DISC 56 of the client PC 500. In addition, in step S602, a user input of print setting information, which is designated via the UI, is received.

In the present exemplary embodiment, the print setting information includes a document size, an output paper size, an output method, a paper discharge method, the number of copies, a page layout, a magnification, and a color mode. Furthermore, in the present exemplary embodiment, a plurality of setting values can be set to one setting item. For example, a plurality of setting values, such as "the same as document size" and "A4", can be set as the output paper size. This is intended to later apply a print setting whose dependency on a function of the printing apparatus to the selected intermediate print job on any printing apparatus that can be connected to the system and on which the user inputs a print request.

The user can arbitrarily designate a plurality of setting values for a setting item dependent on the printer via the setting screen illustrated in FIG. 7. The printer driver 320 receives the designated plurality of setting values as the print setting information. The UI illustrated in FIG. 7 is provided by a print processing service of the application server 300 to the client PC 500 as a general-purpose UI not dependent on the printers 2000 through 2002.

At the timing at which the UI illustrated in FIG. 7 is displayed, the user of the client PC 500 has not identified or designated which printer is to be used. In other words, in this state, the user can execute a print setting intending to use either a high-function printer or a low-function printer. The state in which the user has not identified a printer (i.e., the state at the above-described timing) refers to a state in which the user of the client PC 500 is not aware of an output destination of print information to be output at the above-described timing.

In the example illustrated in FIG. 7, the user has selected "A4" for the output paper size only, "color" for the color mode only, and "off" for "punching" of the paper discharge method only. However, for the output method, two setting values, i.e., "two-sided printing" and "one-sided printing" are selected. In addition, for stapling also, two setting values, i.e., "on" and "off", are selected.

In the present exemplary embodiment, a setting item dependent on the printer (hereinafter simply referred to as a "printer-dependent setting item") refers to an item to which whether processing can be executed and the range of the processing are determined according to the configuration of optional functions and the capacity of the printer. For example, the printer-dependent setting item includes whether two-sided printing, stapling, or color printing is available and the range of the paper size that can be used on the printer. On the other hand, a setting item not dependent on the printer (hereinafter simply referred to as a "printer non-dependent setting item") refers to a setting item whose value can be applied on a host apparatus, such as n-up printing. In other words, the printer non-dependent setting item is a setting item that can be executed on any printer.

In step S603, the printer driver 320 transmits the print setting information including the plurality of setting values set by the user to the application according to a specification of an operation of the system.

On the other hand, if it is determined that a user input is not a print setting request (NO in step S601), then the processing advances to step S611. In step S611, the printer driver 320 determines whether document data has been received from the web application 310 as a print request. If it is determined that document data has been received from the web application 310 as a print request (YES in step S611), then the processing advances to step S612.

In step S612, the printer driver 320 receives the print setting information including the setting from the application and/or the OS based on the document data received from the web application 310. In addition, in step S612, the printer driver 320 receives a user ID of the user who has input the print request by using the user information acquisition function 327.

In step S613, the intermediate print job generation function 322 generates an intermediate print job (for example, an Enhanced Metafile (EMF)) that is not dependent on the printer based on the document data received from the web application 310. In addition, in step S613, the printer driver 320 mutually associates the intermediate print job, which has been generated by the intermediate print job generation function 322, with the above-described user ID and the print setting information. Furthermore, the printer driver 320 temporarily spools the mutually associated intermediate print job, the user ID, and the print setting information on the print job storage memory 330.

In step S614, the printer driver 320 adds the information to a job management table illustrated in FIG. 8. Then the processing ends.

FIG. 8 illustrates an example of a job management table generated on the RAM 2 illustrated in FIG. 2. Referring to FIG. 8, a user ID and print setting information are associated with a job name of each intermediate print job and the mutually associated job name, the user ID, and the print setting information are stored in the job management table.

The job management table collectively manages intermediate print jobs input by a plurality of users. Different pieces of print setting information are assigned to different intermediate print jobs. The spooled intermediate print job is stored on the print job storage memory 330 until a print request is input by the printer.

When the user inputs user information on the printer 2000, a request for pull printing is transmitted from the printer 2000. An arbitrary method can be used for inputting the user information. For example, the user can input the user information by presenting or mounting an ID card or by logging into the printer as described above.

As a result, a normal print request command is transmitted from the printer 2000 to the printer driver 320 via the input/output unit 18. In this case, the printer driver 320 determines "NO" in step S611. Then the processing advances to step S621. In step S621, the printer driver 320 determines whether the normal print request command from the printer 2000 has been received by the print request receiving function 323 via the input/output unit 8.

If it is determined that the normal print request command from the printer 2000 has been received by the print request receiving function 323 via the input/output unit 8 (YES in step S621), then the processing advances to step S622. In step S622, the configuration information acquisition function 328 receives an Internet protocol (IP) address of the printer and the configuration information (printer capacity information) about the printer 2000 from the printer 2000 via the input/output unit 8. In addition, in step S622, the user information acquisition function 327 of the printer driver 320 receives the user ID from the printer 2000.

In the present exemplary embodiment, the configuration information about the printer 2000 is acquired from the printer 2000. However, alternatively, the configuration information about the printer 2000 can be already stored by the printer driver 320 itself. Further alternatively, the configuration information about the printer 2000 can be previously stored in a table including a list of printer configuration information, which is stored on the external memory 11. In this case, the configuration information about the printer 2000 can be read from the table.

To paraphrase this, in the printing system according to the present exemplary embodiment, the source of acquiring the printer configuration information is not limited to a particular apparatus. Similarly, the user ID can be alternatively acquired from another device, such as an input device (i.e., a keyboard) of a computer to which the printer driver 320 is installed.

In step S623, the printer driver 320 determines whether any unprocessed intermediate print job corresponding to the user ID received in step S622 exists in the print jobs included in the job management table. If it is determined that no unprocessed intermediate print job corresponding to the user ID received in step S622 exists (NO in step S623), then the processing ends. On the other hand, if it is determined that an unprocessed intermediate print job corresponding to the user ID received in step S622 exists (YES in step S623), then the processing advances to step S624.

In step S624, the printer driver 320 selects one intermediate print job and reads the print setting information about the selected intermediate print job. Then the processing advances to step S631. In step S631, the printer driver 320 serially extracts items dependent on the printer 2000 from the print setting information read in step S624. Then the printer driver 320 executes the following processing.

More specifically, the printer driver 320 extracts a setting value that has the highest dependency on model information about the printer from among a plurality of setting values (i.e., the plurality of setting values illustrated in FIG. 7 is set) of the determination target items included in the print setting information read in step S624.

In the present exemplary embodiment, as illustrated in FIG. 9, for the "dependency on the printer" (hereinafter simply referred to as a "printer dependency"), if a setting value cannot be applied unless more printer options are used or unless a printer having a higher capacity is used, the setting value is defined as having a "high" printer dependency. On the other hand, if another setting value is not so dependent on the printer as the highly printer-dependent setting value is, another setting value is defined as having a "low" printer dependency.

For example, in the case of the paper size, the setting value "A4 size" has a low printer dependency because the A4 size is supported by most office printers. On the other hand, the setting value "A3 size" has a high printer dependency because the A3 size is supported by a large printing apparatus only.

Similarly, because monochromatic printing can be executed on any printer, the setting value "monochromatic printing" has a low printer dependency. On the other hand, because color printing cannot be executed on color printers only, the setting value "color printing" has a high printer dependency. In addition, the setting value "two-sided printing" has a printer dependency higher than the printer dependency of the setting value "one-sided printing" because two-sided units are required in executing two-sided printing. Furthermore, the setting value "bookbinding printing" has a high printer dependency because a saddle finisher and a v-folding finisher are required.

To paraphrase this, the "printer dependency" indicates how many models (types) of printers a specific setting value can be processed or applied. More specifically, as the number of models (types) of printers on which a setting value can be processed, the printer dependency of the setting value may be defined lower. Data of the printer dependency is stored on the external memory 11 and is read by the printer driver 320 where necessary.

In step S633, the printer driver 320 compares the setting value extracted in step S632 with the configuration information about the printer 2000, which has input the print request. In addition, in step S633, the printer driver 320 determines whether the printer 2000 can process the extracted setting value.

If it is determined that the printer 2000 can process the extracted setting value (YES in step S633), then the processing advances to step S634. In step S634, the printer driver 320 finally determines the setting value extracted in step S632 as the setting value of the setting item. To "finally determine the setting value" refers to definitely determine the setting value as the setting value of the setting item.

On the other hand, if it is determined that the printer 2000 cannot process the extracted setting value (NO in step S633), then the processing advances to step S641. In step S641, the printer driver 320 determines whether any other setting value has been set to the determination target setting item. If it is determined that any other setting value has been set to the determination target setting item (YES in step S641), then the processing advances to step S642. In step S642, the printer driver 320 serially extracts setting values from among the other setting values in order of high printer dependency. In step S643, the printer driver 320 compares the setting value extracted in step S642 with the configuration information to determine whether the setting value extracted in step S642 can be processed.

If it is determined that the setting value extracted in step S642 can be processed (YES in step S643), then the processing advances to step S634.

In step S634, the printer driver 320 finally applies the setting value as the setting information and finally determines the setting value as the setting value of the target setting item.

On the other hand, if it is determined that all the setting values cannot be processed (NO in step S641 or step S643), then the processing advances to step S644. In step S644, the printer driver 320 determines that the intermediate print job cannot be printed. Then the processing on the intermediate print job ends. Then the processing advances to step S623 to execute processing of a next intermediate print job.

On the other hand, if the setting value of the determination target item has been finally determined in step S634, then the processing advances to step S635. In step S635, the printer driver 320 determines whether any other printer-dependent setting item exists. If it is determined that any other printer-dependent setting item exists (YES in step S635), then the processing advances to step S631. In step S631, the printer driver 320 executes processing on a next setting item included in the print setting information included in the same intermediate print job.

On the other hand, if it is determined that no other printer-dependent setting item exists (NO in step S635), then the processing advances to step S625. In this case, the printer driver 320 determines that all the setting items in the print setting information included in the processing target intermediate print job can be processed and finally determines the print setting information.

The series of the print setting determination processing from step S624 to step S625 is executed by the print setting determination function 324.

In step S626, the output print job generation function 325 of the printer driver 320 generates an output print job based on the determined print setting information and the intermediate print job. For example, the output print job generation function 325 generates a PDL file as an output print job. In the present exemplary embodiment, the intermediate print job and the output print job have different file formats. However, the intermediate print job and the output print job can have the same file format.

In step S627, the printer driver 320 transmits the generated output print job to the printer that has input the print request by using the IP address acquired in step S622. Then the series of processing on one print job ends. In step S628, the configuration information acquisition function 328 updates the job management table. Then the processing returns to step S623.

Figure 11:
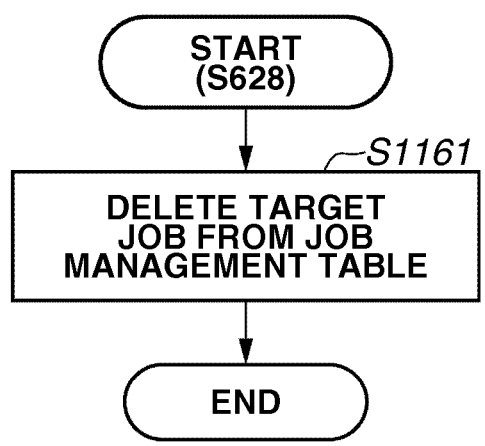
FIG. 11 is a flowchart illustrating an exemplary flow of data processing executed by the information processing apparatus.

As illustrated in FIG. 11, in the processing for updating the job management table, in step S1161, the printer driver 320 deletes the intermediate print job, based on which the transmitted output print job has been generated, from the job management table.

In step S623, the printer driver 320 executes the processing similar to that described above on the other intermediate print jobs input by the same user who has input the print request in step S621. On the other hand, if it is determined that the user has not input a normal print request on the printer (NO in step S621), then the processing advances to step S651. In step S651, the printer driver 320 further receives another request. However, because no other request is input, the processing ends here.

Figure 10A:
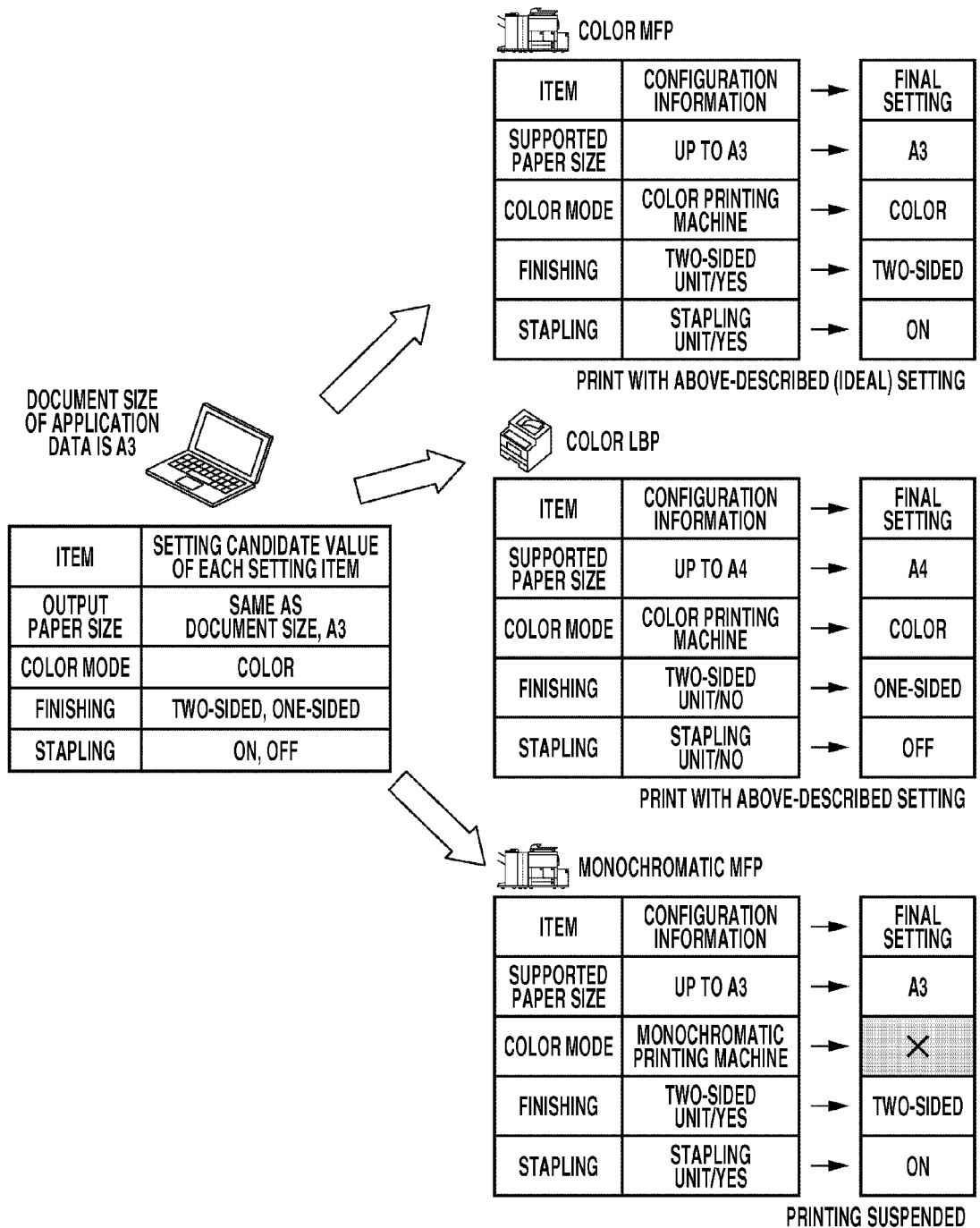
FIGS. 10A and 10B illustrate an example of processing of a print job executed by the printing system.
Figure 10B:
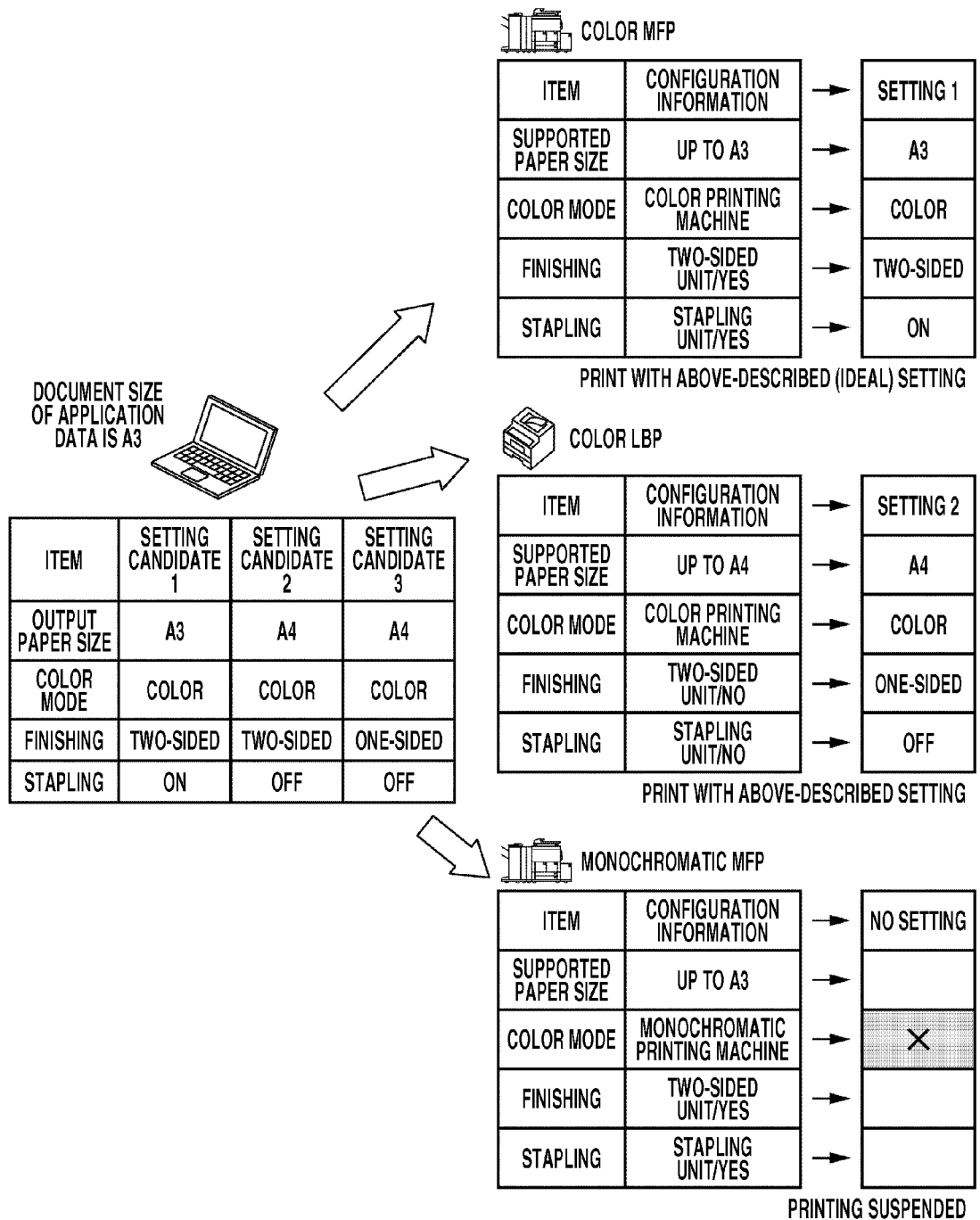

In the following description, a specific example of print processing executed under control of the printer driver 320 will be described in detail. FIGS. 10A and 10B illustrate an example of the processing executed by the flow illustrated in FIG. 6. More specifically, on the client PC 500, the print setting information is set as illustrated by a left chart of FIG. 10A.

In the present exemplary embodiment, it is supposed that the paper size "A3" has been set to the document data generated by the application. In addition, it is supposed that only one intermediate print job is spooled for the user. In the example illustrated in FIG. 10A, a plurality of setting values can be set to one setting item.

For the setting, a plurality of setting values can be set by the user to one setting candidate via the UI illustrated in FIG. 7. More specifically, two setting values, i.e., "same as the document size" and "A4" can be set to one setting item as the output paper size.

In the example illustrated in FIG. 10B, a plurality of setting candidates 1 through 3, in which one setting value has been set to a setting item of one print job, can be set. In the example illustrated in FIG. 10B, similar to FIG. 10A, the user has set each setting value to each setting candidate via the UI illustrated in FIG. 7.

Suppose that the user has input a normal print request command from a color MFP, which is illustrated in FIG. 10A above its upper right chart. In this case, in step S622 (FIG. 6), the printer driver 320 receives the IP address of and the configuration information about the color MFP illustrated in the chart of FIG. 10A.

In steps S631 and S632, the printer driver 320 serially verifies four items, such as "output paper size", "color mode", "finishing", and "stapling". It is supposed that the setting values "same as the document size" and "A4" have been set as the setting value of the setting item. "output paper size", which is included in the print setting information illustrated in FIG. 10A.

Accordingly, the printer driver 320 first extracts the setting value "same as the document size" (i.e., output in A3 size), which has a high printer dependency. Then the printer driver 320 compares the extracted setting value with the configuration information about the color MFP.

Because the color MFP supports the A3 size, the printer driver 320 applies the setting value "same as the document size" as the setting value. Subsequently, the printer driver 320 executes verification on the setting values of finishing, i.e., "two-sided" and "one-sided" and the setting value of stapling, i.e., "on" and "off", starting from the setting value having the higher printer dependency of the two.

As a result, in step S625, if the user has input the print request from the color MFP, the printer driver 320 finally determines the print setting information because all the setting values can be processed in this case.

On the other hand, a color laser beam printer (color LBP), which is illustrated in FIG. 10A in the right middle portion thereof, is an A4 size printer. Suppose that the user has input a normal print request command from the color LBP.

In step S633, because the setting value of the output paper size "same as the document size" (i.e., output in A3 size) is not supported by the color LBP, the printer driver 320 determines that the setting value "same as the document size" cannot be processed. In step S634, the printer driver 320 extracts a next setting value "A4", of the setting item "output paper size".

Because the A4 size can be processed on the color LBP, the printer driver 320 finally determines the setting value "A4 size" as the setting value of the setting item "output paper size" in step S634.

As described above, in the present exemplary embodiment, the printer driver 320 finally determines the setting value having a high dependence on the model information, from among a plurality of setting values included in the print setting information registered on the print job storage memory 330 in step S602 as the print setting information to be set to the intermediate print job registered on the print job storage memory 330. To paraphrase this, the printer driver 320 determines whether a setting value having a high dependency on the model information, among the plurality of setting values included in the print setting information registered on the print job storage memory 330 among the plurality of setting values set by the user to the printing information by executing the processing in step S631, as the print setting information.

More specifically, the printer driver 320 determines whether the setting value having a high dependency on the model information as the print setting information by using the model information acquired from the printer that has transmitted the print request.

If it is determined that the setting value having a high dependency on the model information cannot be set as the print setting information, the printer driver 320 finally determines a setting value having a highest dependency, of setting values having a low dependency on the model information among the plurality of setting values, as the print setting information.

After processing the finishing setting items and the stapling setting items in the similar manner as described above, the printer driver 320 finally determines the setting values "one-sided" and "off" (i.e., stapling is not to be applied) as the setting values.

On the other hand, suppose that the user has input a print request from a monochromatic MFP, which is illustrated in FIG. 10A in the lower right portion thereof. In this case, the setting value "color" for the color mode is determined not to be applied by the comparison in step S633. In addition, because no other candidate value has been set to the setting item for the color mode in step S641, then in step S644, the printer driver 320 determines that the print job cannot be printed by the monochromatic MFP.

In the present exemplary embodiment, a plurality of setting values can be set to the setting item included in the print setting information as described above with reference to the UI illustrated in FIG. 7. However, alternatively, a plurality of pieces of print setting information can be set as illustrated in FIG. 10B.

In this case, for example, three candidates for the print setting information are generated as illustrated in the chart illustrated in FIG. 10B in its left portion. If the user inputs a print request from the color MFP in this state, it is known that all the setting values included in the print setting information of the setting candidate 1 are supported as a result of comparison with the configuration information about the color MFP. Accordingly, the printer driver 320 finally determines the setting candidate 1 as the final print setting information.

On the other hand, if the user has input a print request from the color LBP, the setting candidates 1 and 2 include a setting value not supported by the color LBP while all the setting values included in the setting candidate 3 are supported by the color LBP. Accordingly, the setting candidate 3 is finally determined as the print setting information.

If the user has input the print request from the monochromatic MFP, the setting of the color mode does not match for all the setting candidates. Accordingly, the printing is cancelled.

As described above, regardless of from which printer the user inputs a pull printing request, the present exemplary embodiment can reduce the threat of outputting a print product not desired by the user.

Even if a print job can be printed by utilizing the printing system according to the first exemplary embodiment described above, the user may not always obtain an output product just as desired by the user. In this case, the user may input a request for reprinting the print job by using another printer. In the following description, a method that enables reprinting according to a special instruction later input by the user instead of deleting a spooled intermediate print job if the finally determined print setting information is not appropriate for outputting a product just as desired by the user will be described.

Now, exemplary processing of a job according to a second exemplary embodiment of the present invention will be described in detail.

If it is determined that the print setting information finally determined by the printer driver 320 has been determined by a setting value having a low dependency on the model information, the present exemplary embodiment prepares for a user request for reprinting. In addition, if a reprinting request is received from a different printer, the printer driver 320 executes first determination processing, which is processing for determining whether a setting value having a high dependency on the model information acquired from the printer that has received the reprinting request, of a plurality of print setting values, can be set as the print setting information.

If it is determined that the setting value having a high dependency on the model information can be set as the print setting information, the printer driver 320 executes processing for finally determining the print setting information in the following manner. More specifically, first, the printer driver 320 searches the print job storage memory 330 for a print job to be reprinted by using identification information for identifying the user, which is included in the reprinting request received from any one of the printers illustrated in FIG. 1.

In addition, the printer driver 320 finally determines the setting value having a high dependency on the model information acquired from the printer, from which the reprinting request has been transmitted, as the print setting information to the extracted reprint job.

Now, the processing according to the present exemplary embodiment will be described in detail below with reference to the following flow charts.

In addition to the functions of the printer driver 320 described above with reference to FIG. 4, the present exemplary embodiment includes the following functions not illustrated in the drawing, i.e., an incomplete print job storage function, a reprint request receiving function, a print verification function, and an output print job regeneration function. The reprinting is implemented by the CPU 1 of the application server 300 by executing the printer driver 320.

The processing according to the present exemplary embodiment is similar to the processing executed by the first exemplary embodiment except steps S628 and S651. In the following description, processing different from the first exemplary embodiment only will be described in detail.

Figure 12:
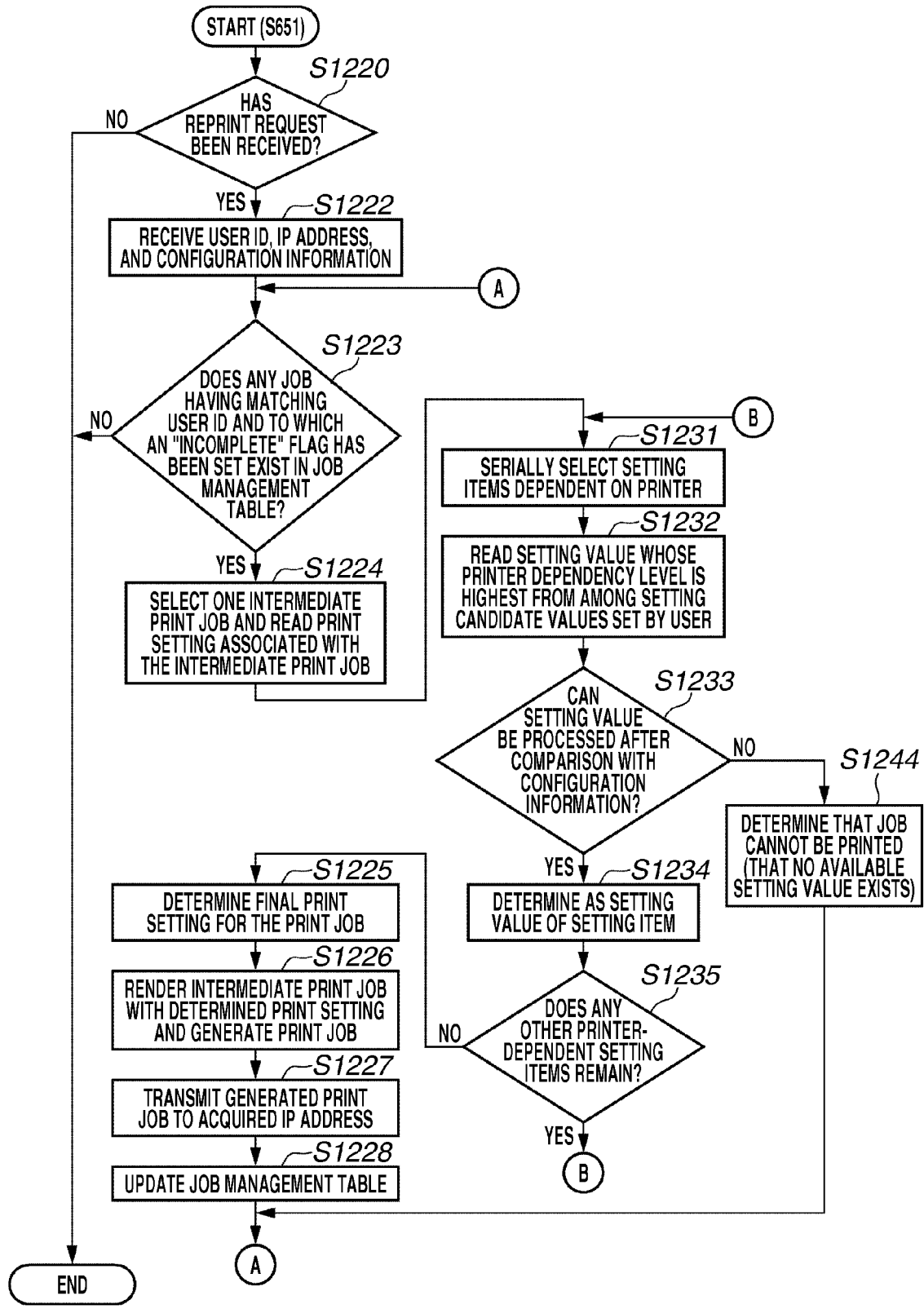
FIG. 12 is a flowchart illustrating an exemplary flow of data processing executed by the information processing apparatus.
Figure 13:
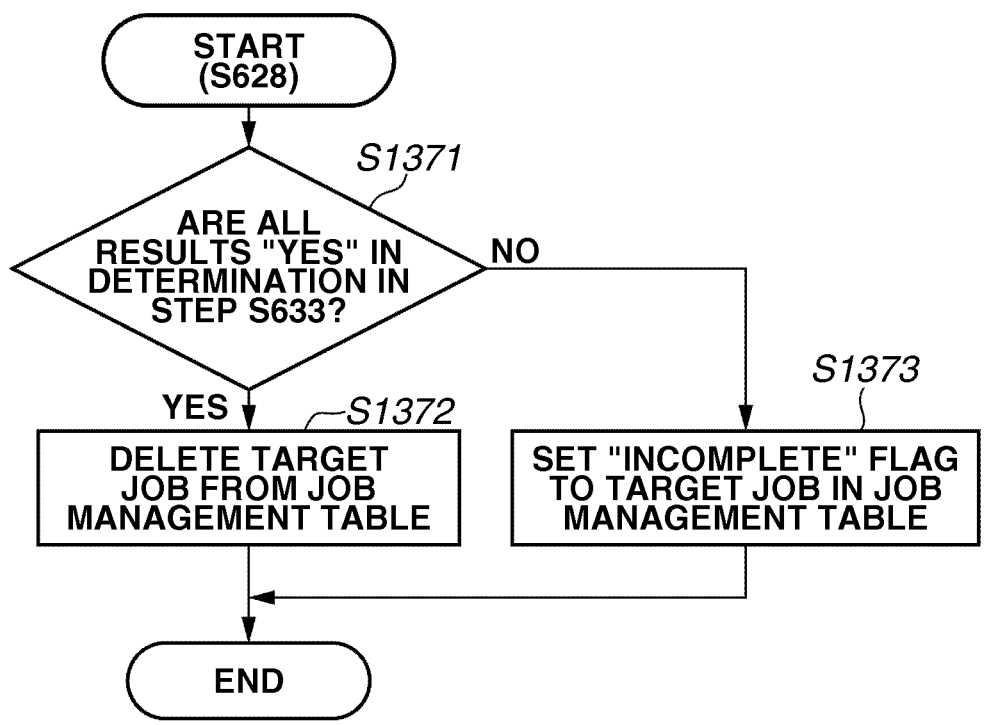
FIG. 13 is a flowchart illustrating an exemplary flow of data processing executed by the information processing apparatus.

FIGS. 12 and 13 are flow charts illustrating an exemplary flow of data processing executed by the information processing apparatus according to the present exemplary embodiment. The processing illustrated in the flow charts of FIGS. 12 and 13 corresponds to processing executed by the printer driver 320 of the application server 300 illustrated in FIG. 2. Each step of the flow charts of FIGS. 12 and 13 is implemented by the CPU 1 of the application server 300 by loading and executing the printer driver 320 on the RAM 2. The processing described below is executed by the printer driver 320.

The processing illustrated in FIG. 12 corresponds to step S651 illustrated in FIG. 6. The processing illustrated in FIG. 13 corresponds to step S628 illustrated in FIG. 6. To begin with, a method executed when the intermediate print job is not deleted in normal print processing will be described in detail below.

FIG. 13 illustrates details of the processing for updating the job management table executed in step S628. Referring to FIG. 13, in step S1371, the printer driver 320 determines whether a setting value having the highest printer dependency (a setting ideal for the user) has been set as the setting value of each printer-dependent setting item.

If it is determined that a setting value having the highest printer dependency has been set as the setting value of each printer-dependent setting item (YES in step S1371), then the processing advances to step S1372. In step S1372, the printer driver 320 deletes the information about the intermediate print job, based on which the transmitted output print job has been generated, similar to the first exemplary embodiment. Then the processing ends.

On the other hand, if it is determined that the ideal setting for the user has not been set (NO in step S1371), then the processing advances to step S1373. In step S1373, the printer driver 320 sets an "incomplete" flag to the intermediate print job, based on which the transmitted output print job has been generated, by using the incomplete print job storage function to handle the job as an incomplete print job. Furthermore, in step S1373, the printer driver 320 does not delete the incomplete print job from the job management table. Then the processing ends.

The incomplete print job is stored on the print job storage memory 330 until a reprinting request, which will be described in detail below, is input. FIG. 14 illustrates an example of a job management table, by which an incomplete print job can be distinguished.

The reprinting processing will be described in detail below with reference to the flow chart of FIG. 12. When a reprinting request is input by the user via the printer 2000, the printer driver 320 executes reprinting in step S651. FIG. 12 illustrates the details of the reprinting processing.

Processing in steps S1224 through S1235 is similar to the processing in steps S624 through S635 unless otherwise described. Referring to FIG. 12, in step S1220, the printer driver 320 determines whether a reprinting request command has been received from the printer 2000 via the input/output unit 8 by using the reprint request receiving function.

If it is determined that no reprinting request from the printer 2000 has been received via the input/output unit 8 by using the reprint request receiving function (NO in step S1220), then the processing ends. On the other hand, if it is determined that a reprinting request from the printer 2000 has been received via the input/output unit 8 by using the reprint request receiving function (YES in step S1220), then the processing advances to step S1222.

In step S1222, the configuration information acquisition function 328 of the printer driver 320 receives the IP address of the printer and the configuration information about (the printer capacity information about) the printer 2000 from the printer 2000. In addition, in step S1222, the user information acquisition function 327 of the printer driver 320 receives the user ID from the printer 2000.

In step S1223, the printer driver 320 determines whether any incomplete print job corresponding to the user ID exists by searching the job management table illustrated in FIG. 14. If it is determined that an incomplete print job exists (YES in step S1223), then the processing advances to step S1224. In step S1224, the printer driver 320 selects one incomplete print job and reads the print setting information associated with the incomplete print job.

In step S1231, the printer driver 320 extracts a printer-dependent setting item from the read print setting information. In step S1232, the printer driver 320 reads a setting value having a highest printer dependency from the setting candidates set by the user. In step S1233, the printer driver 320 determines whether the read setting value having the highest printer dependency can be processed by the printer 2000.

If it is determined that the read setting value having the highest printer dependency cannot be processed by the printer 2000 (NO in step S1233), then in step S1244, the printer driver 320 determines that the job cannot be printed. Then, the processing returns to step S1223 to end the reprinting processing. On the other hand, if it is determined that the read setting value having the highest printer dependency can be processed by the printer 2000 (YES in step S1233), then the processing advances to step S1234.

In step S1234, the printer driver 320 finally determines the setting value having the highest printer dependency. In step S1225, the printer driver 320 executes the processing in steps S1231 through S1234 on all the printer-dependent setting items and determines whether any item to be set remains.

If the printer driver 320 determines that an item to be set remains (YES in step S1235), then the processing returns to step S1231. On the other hand, if the printer driver 320 determines that no item to be set remains (NO in step S1235), then the processing advances to step S1225.

In step S1225, the printer driver 320 determines the print setting information by using the output print job generation function 325. In step S1226, the printer driver 320 generates an output print job based on the determined print setting information and the incomplete print job.

In step S1227, the printer driver 320 transmits the generated output print job to the printer that has transmitted the reprinting request by using the IP address of the printer acquired in step S1222. In step S1228, the printer driver 320 updates the job management table by deleting the incomplete print job whose printing has been completed from the job management table. Then the processing returns to step S1223.

If a plurality of pieces of print setting information illustrated in FIG. 10B has been set, similar processing is executed. Referring to FIG. 10B, if the job is output according to the print setting information other than the setting candidate 1 (i.e., if the job is output from the color LBP or the monochromatic MFP), the printer driver 320 does not delete the intermediate print job after printing but leaves the job in the job management table as an incomplete print job.

If the user inputs a reprinting request for reprinting the incomplete print job by the color MFP in step S1220, then the processing advances to step S1224. In step S1224, the printer driver 320 determines whether the job can be printed according to the setting candidate 1. If it is determined that the job can be printed according to the setting candidate 1 (YES in step S1224), then the printer driver 320 executes processing in steps S1225 through S1227.

More specifically, the printer driver 320 generates an output print job based on the setting candidate 1 and the incomplete print job. In addition, the printer driver 320 transmits the generated output print job to the color MFP, which has input the reprinting request by using the acquired ID address of the printer. In step S1228, the printer driver 320 deletes the incomplete print job whose printing has been completed from the job management table. Then the processing returns to step S1223.

With the above-described configuration, even if a print product to which the print setting information designated by the user is appropriately applied cannot be output on the printer from which the user has input the print request, the present exemplary embodiment can output a print product just as desired by the user by reprinting the job by using the printer capable of executing optimum printing.

In the first exemplary embodiment described above, if all the setting values set to a specific setting item cannot be processed by the printer to be used in the printing, the printer driver 320 cancels the printing of the intermediate print job in step S644 illustrated in FIG. 6. As a result, if no appropriate printer is available because an appropriate printer exists but the printer is out of order or because the present environment is different from the user's environment, some print jobs may not be output by any available printer.

In the present exemplary embodiment, the user is allowed to compulsorily output a print job whose printing is highly required according to a special instruction by the user. In printing the print job, the printer driver 320 determines the print setting information to output a print product to which the user's desire is applied as much as possible based on the print setting information about the print job and the printer configuration information.

In the following description, processing of a job according to a third exemplary embodiment will be described in detail. In the present exemplary embodiment, the printer driver 320 executes second determination processing. In the second determination processing, the printer driver 320 determines whether any of a plurality of setting values included in the print setting information registered on the print job storage memory 330 can be finally determined as the print setting information by using the model information acquired from the printer from which the user has input the print request.

If it is determined that none of the plurality of setting values can be finally determined as the print setting information, the printer driver 320 executes second storage processing. More specifically, the printer driver 320 associates the intermediate print job with the print setting information set to the intermediate print job and identification information for identifying the user in a compulsory print job file. The compulsory print job is stored on the print job storage memory 330.

If a compulsory print request is received from any printer, the printer driver 320 determines print information to be set to the compulsory print job searched from the print job storage memory 330 by using the identification information for identifying the user, which is included in the compulsory print request. More specifically, the printer driver 320 executes processing for determining a setting value having a highest dependency on the model information acquired from the printer from which the user has input a reprinting request, among the setting values having a low dependency on the model information, as the print setting information.

Now, the processing according to the present exemplary embodiment will be described in detail below with reference to the flow chart illustrated in the drawing. The compulsory printing is implemented by the CPU 1 by executing the printer driver 320, which includes a compulsory print request receiving function and a print setting complementing function, which are not illustrated in the drawing, as well as the functions illustrated in FIG. 4.

In the present exemplary embodiment, the printer driver 320 executes processing for performing compulsory printing on a print job that has not been printed by the normal printing according to the first exemplary embodiment and the second exemplary embodiment.

Figure 15B:
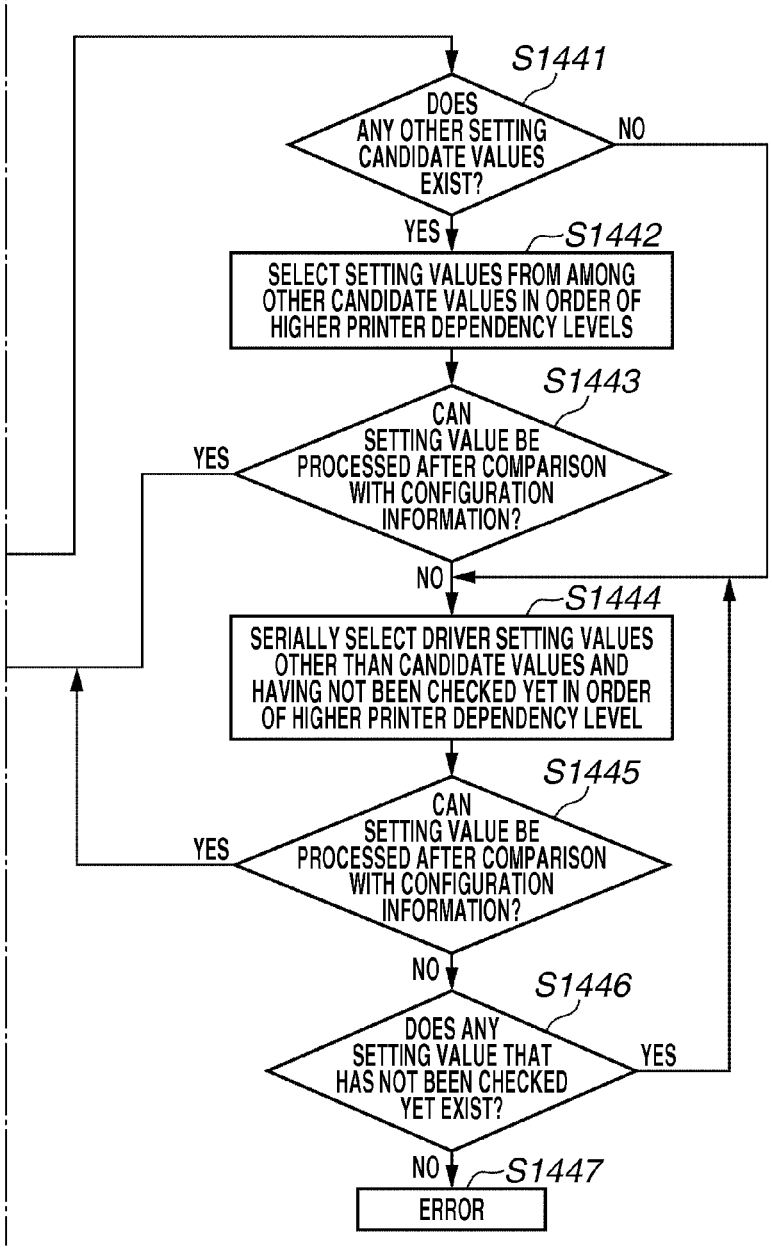
FIG. 15, which is composed of FIGS. 15A and 15B, is a flow chart illustrating an exemplary flow of data processing executed by the information processing apparatus.

When a compulsory print request is input by the user via the printer 2000, the printer driver 320 executes compulsory print processing in step S651 illustrated in FIG. 6. FIG. 15 illustrates the details of the compulsory print processing. FIG. 15 is a flow chart illustrating an exemplary flow of data processing executed by the information processing apparatus according to the present exemplary embodiment.

The processing illustrated in the flow chart of FIG. 15 corresponds to processing executed by the printer driver 320 of the application server 300 illustrated in FIG. 2. Each step of the flow chart of FIG. 15 is implemented by the CPU 1 by loading and executing the printer driver 320 on the RAM 2. The processing described below is executed by the printer driver 320.

Processing in steps S1424 through S1443 is similar to the processing in steps S624 through S643 unless otherwise described. Referring to FIG. 15, in step S1420, the printer driver 320 determines whether a compulsory printing request command has been received from the printer 2000 by using a compulsory printing request receiving function.

If it is determined that no compulsory printing request command has been received from the printer 2000 by using a compulsory printing request receiving function (NO in step S1420), then the processing ends. On the other hand, if it is determined that a compulsory printing request command has been received from the printer 2000 by using a compulsory printing request receiving function (YES in step S1420), then the processing advances to step S1422.

In step S1422, the configuration information acquisition function 328 of the printer driver 320 receives the IP address of the printer and the configuration information about (the printer capacity information about) the printer 2000 from the printer 2000. In addition, in step S1422, the user information acquisition function 327 of the printer driver 320 receives the user ID from the printer 2000.

In step S1423, the printer driver 320 determines whether any unprocessed print job corresponding to the user ID exists by searching the job management table. If it is determined that an incomplete print job exists (YES in step S1423), then the processing advances to step S1424. In step S1424, the printer driver 320 selects one incomplete print job and reads the print setting information associated with the incomplete print job.

In step S1432, the printer driver 320 extracts a printer-dependent setting item from the read print setting information. In step S1432, the printer driver 320 reads a setting value having a highest printer dependency from the setting candidates set by the user. In step S1433, the printer driver 320 compares the read setting value with the configuration information and determines whether the read setting value having the highest printer dependency can be processed by the printer 2000.

If it is determined that the read setting value having the highest printer dependency cannot be processed by the printer 2000 (NO in step S1433), then the processing advances to step S1441. In step S1441, the printer driver 320 determines whether any other setting value has been set. If it is determined that no other setting candidate value exists (NO in step S1441), then the processing advances to step S1444. On the other hand, if it is determined that another setting value exists (YES in step S1441), then the processing advances to step S1442. In step S1442, the printer driver 320 serially reads the setting values from the other setting candidates in order of high printer dependency. Then the processing advances to step S1443.

In step S1443, the printer driver 320 compares the read setting value with the configuration information and determines whether the setting value can be processed by the printer 2000. If it is determined that the setting value can be set (YES in step S1443), then the processing advances to step S1434. On the other hand, if it is determined that the read setting value cannot be processed by the printer 2000 as a result of a comparison with the configuration information (NO in step S1443), then the processing advances to step S1444.

The processing advances to step S1444 if no setting value that can be processed by the printer 2000 is included in the setting value set by the user. In step S1444, the printer driver 320 extracts setting values (alternatives that the printer driver can select) other than the setting value of the setting item in order of high printer dependency. In step S1445, the printer driver 320 determines whether the extracted setting value can be processed by the printer 2000.

If it is determined that the extracted setting value can be processed by the printer 2000 (YES in step S1445), then the processing advances to step S1434. On the other hand, if it is determined that the extracted setting value cannot be processed by the printer 2000 (NO in step S1445), then the processing advances to step S1446. In step S1446, the printer driver 320 determines whether any setting value to which no determination has been executed remains.

If it is determined that a setting value to which no determination has been executed remains (YES in step S1446), then the processing returns to step S1444 and the printer driver 320 repeats the processing in step S1444 and beyond to determine the setting value of the setting item.

Because the setting value having the lowest printer dependency (usually the default setting value) of any setting item can be processed by the printer 2000, the result of the determination in step S1446 may not be normally "NO". However, if it is determined that no setting value to which no determination has been executed remains (NO in step S1446), then the processing advances to step S1447. In step S1447, the printer driver 320 presents an error notification.

On the other hand, if it is determined that the setting value having the highest printer dependency can be processed by the printer 2000, then the processing advances to step S1434. In step S1434, the printer driver 320 finally determines the setting value having the highest printer dependency as the setting value of the setting item.

In step S1435, the printer driver 320 determines whether any printer-dependent setting item remains. If it is determined that a printer-dependent setting item remains (YES in step S1435), then the processing returns to step S1431 and the printer driver 320 repeats the processing in step S1431 and beyond. On the other hand, if it is determined that no printer-dependent setting item remains (NO in step S1435), then the processing advances to step S1425.

In step S1425, the printer driver 320 sets the setting value to all the printer-dependent setting items and finally determines the print setting information. In step S1426, the output print job generation function 325 of the printer driver 320 generates an output print job based on the incomplete print job by using the determined print setting information.

In step S1427, the printer driver 320 transmits the generated output print job to the printer that has transmitted the compulsory printing request by using the IP address of the printer acquired in step S1422. In step S1428, the printer driver 320 updates the job management table by deleting the incomplete print job whose printing has been completed. Then the processing returns to step S1423.

The processing in step S1444 will be described in detail below. Suppose that in the example illustrated in FIG. 9, if all the setting values of the item "paper size" included in the print setting information set by the user are not supported by the printer. In this case, the printer driver 320 sets the setting value "A4" to the item "paper size". By executing the above-described processing, the print data of the print job, regardless of the size of the document, can be adjusted to the A4 size due to a standard-size enlargement and reduction function and can be printed without a partial loss of the image.

Similarly, in the example illustrated in FIG. 9, the setting value "bookbinding printing" is set to the item "finishing". If the setting value "bookbinding printing" is not supported by the printer, the printer driver 320 first verifies whether the setting value "two-sided printing" can be processed by the printer. If it is determined that the setting value "two-sided printing" is supported by the printer, the printer driver 320 sets the setting value "two-sided printing" as the setting value of the item "finishing".

On the other hand, if it is determined that the setting value "two-sided printing" is not supported by the printer, then the printer driver 320 sets the setting value "one-sided printing" as the setting value of the item "finishing".

Similarly, the setting value "at two positions" of the item "stapling" is not supported by the printer, then the printer driver 320 verifies whether the setting value "at one position" is supported by the printer. If it is determined that the setting value "at one position" is supported by the printer, the printer driver 320 sets the setting value "at one position" as the setting value of the item "stapling". On the other hand, if it is determined that the setting value "at one position" is not supported by the printer either, the printer driver 320 sets the setting value "off" as the setting value of the item "stapling".

By executing the above-described processing, even if no printer that can execute an optimum output is available, the present exemplary embodiment can output a product to which the user's desire is applied as much as possible.

As described above, the system that uses the information processing apparatus according to the first through the third exemplary embodiments of the present invention, it is easily feasible to implement a client that does not require a printer driver and to freely construct a system regardless of the type of a printer to be used. In addition, the system according to the first through the third exemplary embodiments of the present invention can be readily applied to a cloud computing environment.

Furthermore, because the system according to the above-described exemplary embodiments of the present invention does not require a print server, the system of the present invention enables the construction of a pull printing system with low costs.

The present invention is not limited to the above-described exemplary embodiments. In other words, the present invention can be appropriately modified according to the purpose of the present invention within the scope of the present invention including an organic combination of the above-described exemplary embodiments. To paraphrase this, the modification of the present invention is not excluded from the scope of the present invention.

According to each exemplary embodiment of the present invention described above, even if the capacity of a printer to be used in outputting a job is not known at the timing of inputting a print instruction on a client apparatus, a product to be actually output by the printing can be output according to the user's desire as much as possible.

More specifically, in setting a setting value of high functions intending to use a high-function printer, a setting value (a candidate value) is previously set within the tolerance. Accordingly, the present exemplary embodiment can print the input print job according to the setting value compliant with the printer without merely executing compulsory printing of the job even if a low-function printer only actually exists. As a result, the present exemplary embodiment can execute optimum printing according to the capacity of the printer.

In addition, for a job that the user desires to output by a specific output method, if no printer that can execute the output by the specific method is available, the present exemplary embodiment does not execute the printing. Accordingly, the present exemplary embodiment can prevent a wasteful consumption of paper.

Furthermore, if a job has been printed according to the print setting information that does not match the user's desire, the server stores the intermediate print job and the incomplete print job can be reprinted on a printer having the capacity high enough to print the job as desired by the user.

Processing implemented by a combination of the processing in steps of the above-described flow charts of the processing according to each exemplary embodiment can implement an exemplary embodiment of the present invention if the processing is not illustrated in the attached drawings. In addition, processing executed by performing the processing in steps of the flow charts of each exemplary embodiment in a different order can implement an exemplary embodiment of the present invention.

Furthermore, processing including a new step to the flow chart of the processing described above in each exemplary embodiment of the present invention can implement an exemplary embodiment of the present invention.

With the above-described configuration, each exemplary embodiment of the present invention can effectively reduce the threat of outputting a product not desired by the user even if the user has input a pull printing request from any type of printing apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-253197 filed Nov. 11, 2010, which is hereby incorporated by reference herein in its entirety.

What is claimed is:

1. An information processing apparatus configured to receive a print request from any of a plurality of printing apparatuses having mutually different print processing functions via a network, the information processing apparatus comprising:
    a provision unit configured to provide a client apparatus with an application service and a print processing service for printing print information, which is generated by using the application service;
    an acquisition unit configured to acquire, from the client apparatus, (a) print setting information, which is set by the client apparatus to the print information by using a user interface provided by the print processing service, to at least one setting item of which a plurality of setting values is set, which includes a plurality of setting values set for at least one setting item which depends on functions provided in a printing apparatus of the plurality of printing apparatuses and a single setting value set for at least one setting item which is included in the print setting information and does not depend on functions provided in the printing apparatus, (b) the print information, and (c) identification information for identifying a user who has generated the print information;
    a generation unit configured to generate an intermediate print job that does not depend on model information about the plurality of printing apparatuses based on the print information acquired by the acquisition unit from the client apparatus;
    a registration unit configured to mutually associate the intermediate print job generated by the generation unit, the identification information, and the print information and to register the mutually associated intermediate print job, the identification information, and the print information on a storage unit;
    a receiving unit configured to receive a print request for printing the intermediate print job registered on the storage unit by the registration unit from any one of the plurality of printing apparatuses;
    a final determination unit configured to finally determine print setting information to be set to the intermediate print job registered on the storage unit by identifying a setting value having a dependency on the model information higher than a dependency on the model information of other setting values among the plurality of setting values included in the print setting information registered on the storage unit by using the model information that is acquired from the printing apparatus from which the print request has been received by the receiving unit;
    a second generation unit configured to generate the output print job by applying the print setting information determined by the final determination unit to the intermediate print job, which is extracted from the storage unit, by using the identification information for identifying the user, which is included in the print request received by the receiving unit;
    a transmission unit configured to transmit the output print job generated by the second generation unit to the printing apparatus from which the print request has been received by the receiving unit; and
    a deletion unit configured to delete the intermediate print job corresponding to the output print job transmitted by the transmission unit from the storage unit,
    wherein, based on print information of a printing apparatus which has transmitted the print request, a setting value requiring a largest number of functions provided in the printing apparatus in printing among a plurality of setting values set for setting items which is included in the print setting information and depend on the printing apparatus is used as a setting value of an output print job, and wherein each of the functions is provided in the printing apparatus when the printing apparatus is equipped with a corresponding unit, the corresponding unit including one or more of a two-sided unit for two-sided printing and a bookbinding unit for bookbinding printing.

2. A job processing method in an information processing apparatus configured to receive a print request from any of a plurality of printing apparatuses having mutually different print processing functions via a network, the method comprising:

providing a client apparatus with an application service and a print processing service for printing print information, which is generated by using the application service;

acquiring, from the client apparatus, (a) print setting information, which is set by the client apparatus to the print information by using a user interface provided by the print processing service, which includes a plurality of setting values set for at least one setting item which depends on functions provided in a printing apparatus of the plurality of printing apparatuses and a single setting value set for at least one setting item which is included in the print setting information and does not depend on functions provided in the printing apparatus, (b) the print information, and (c) identification information for identifying a user who has generated the print information;

generating an intermediate print job that does not depend on model information about the plurality of printing apparatuses based on the acquired print information from the client apparatus;

mutually associating the generated intermediate print job, the identification information, and the print information and registering the mutually associated intermediate print job, the identification information, and the print information on a storage unit;

receiving a print request for printing the intermediate print job registered on the storage unit by a registration unit from any one of the plurality of printing apparatuses;

finally determining print setting information to be set to the intermediate print job registered on the storage unit by identifying a setting value having a dependency on the model information higher than a dependency on the model information of other setting values among the plurality of setting values included in the print setting information registered on the storage unit by using the model information that is acquired from the printing apparatus from which the print request has been received by the receiving step;

generating the output print job by applying the print setting information determined by the finally determining step to the intermediate print job, which is extracted from the storage unit, by using the identification information for identifying the user, which is included in the print request received by the receiving step;

transmitting the output print job generated by the generating the output print job step to the printing apparatus from which the print request has been received by the receiving step; and deleting the intermediate print job corresponding to the output print job transmitted by the transmitting step from the storage unit, wherein, based on print information of a printing apparatus which has transmitted the print request, a setting value requiring a largest number of functions provided in the printing apparatus in printing among a plurality of setting values set for setting items which is included in the print setting information and depend on the printing apparatus is used as a setting value of an output print job, and wherein each of the functions is provided in the printing apparatus when the printing apparatus is equipped with a corresponding unit, the corresponding unit including one or more of a two-sided unit for two-sided printing and a bookbinding unit for bookbinding printing.

3. A non-transitory computer-readable storage medium storing computer-executable instructions which, when executed by a computer, cause the computer to perform operations comprising:

providing a client apparatus with an application service and a print processing service for printing print information, which is generated by using the application service;

acquiring, from the client apparatus, (a) print setting information, which is set by the client apparatus to the print information by using a user interface provided by the print processing service, which includes a plurality of setting values set for at least one setting item which depends on functions provided in a printing apparatus of the plurality of printing apparatuses and a single setting value set for at least one setting item which is included in the print setting information and does not depend on functions provided in the printing apparatus, (b) the print information, and (c) identification information for identifying a user who has generated the print information;

generating an intermediate print job that does not depend on model information about the plurality of printing apparatuses based on the acquired print information from the client apparatus;

mutually associating the generated intermediate print job, the identification information, and the print information and registering the mutually associated intermediate print job, the identification information, and the print information on a storage unit;

receiving a print request for printing the intermediate print job registered on the storage unit by a registration unit from any one of the plurality of printing apparatuses;

finally determining print setting information to be set to the intermediate print job registered on the storage unit by identifying a setting value having a dependency on the model information higher than a dependency on the model information of other setting values among the plurality of setting values included in the print setting information registered on the storage unit by using the model information that is acquired from the printing apparatus from which the print request has been received by the receiving step;

generating the output print lob by applying the print setting information determined by the finally determining step to the intermediate print job, which is extracted from the storage unit, by using the identification information for identifying the user, which is included in the print request received by the receiving step;

transmitting the output print job generated by the generating the output print job step to the printing apparatus from which the print request has been received by the receiving step; and deleting the intermediate print job corresponding to the output print job transmitted by the transmitting step from the storage unit, wherein, based on print information of a printing apparatus which has transmitted the print request, a setting value requiring a largest number of functions provided in the printing apparatus in printing among a plurality of setting values set for setting items which is included in the print setting information and depend on the printing apparatus is used as a setting value of an output print job, and wherein each of the functions is provided in the printing apparatus when the printing apparatus is equipped with a corresponding unit, the corresponding unit including one or more of a two-sided unit for two-sided printing and a bookbinding unit for bookbinding printing.

* * * * *